United States Patent
Eguchi et al.

(10) Patent No.: US 11,072,719 B2
(45) Date of Patent: Jul. 27, 2021

(54) AQUEOUS PIGMENT DISPERSION

(71) Applicant: KAO CORPORATION, Tokyo (JP)

(72) Inventors: Tetsuya Eguchi, Wakayama (JP); Hirokazu Hyakuda, Izumisano (JP)

(73) Assignee: KAO CORPORATION, Tokyo (JP)

( * ) Notice: Subject to any disclaimer, the term of this patent is extended or adjusted under 35 U.S.C. 154(b) by 152 days.

(21) Appl. No.: 16/324,026

(22) PCT Filed: Aug. 9, 2017

(86) PCT No.: PCT/JP2017/028986
§ 371 (c)(1),
(2) Date: Feb. 7, 2019

(87) PCT Pub. No.: WO2018/030485
PCT Pub. Date: Feb. 15, 2018

(65) Prior Publication Data
US 2019/0169455 A1 Jun. 6, 2019

(30) Foreign Application Priority Data
Aug. 12, 2016 (JP) .............................. JP2016-158790

(51) Int. Cl.
| | | |
|---|---|---|
| *C09D 11/322* | (2014.01) | |
| *C09D 11/107* | (2014.01) | |
| *B41M 5/00* | (2006.01) | |
| *C09D 11/38* | (2014.01) | |
| *C09D 11/326* | (2014.01) | |
| *C09D 17/00* | (2006.01) | |
| *B41J 2/01* | (2006.01) | |
| *B41J 3/407* | (2006.01) | |
| *C09D 11/033* | (2014.01) | |
| *C09D 11/037* | (2014.01) | |

(52) U.S. Cl.
CPC .................. *C09D 11/38* (2013.01); *B41J 2/01* (2013.01); *B41J 3/4078* (2013.01); *B41M 5/00* (2013.01); *B41M 5/0023* (2013.01); *C09D 11/033* (2013.01); *C09D 11/037* (2013.01); *C09D 11/107* (2013.01); *C09D 11/322* (2013.01); *C09D 11/326* (2013.01); *C09D 17/00* (2013.01)

(58) Field of Classification Search
CPC ..... C09D 11/03; C09D 11/033; C09D 11/037; C09D 11/107; C09D 11/322; C09D 11/38
See application file for complete search history.

(56) References Cited

U.S. PATENT DOCUMENTS

| | | |
|---|---|---|
| 7,273,842 B1 | 9/2007 | Vandyk et al. |
| 2006/0100307 A1 | 5/2006 | Uerz et al. |
| 2009/0018245 A1* | 1/2009 | Idemura ............... C09D 11/326 524/357 |
| 2011/0057982 A1* | 3/2011 | Saito ........................ C09C 3/10 347/20 |
| 2012/0232195 A1* | 9/2012 | Mcintyre ............... C08G 18/82 524/90 |
| 2014/0139595 A1 | 5/2014 | Hong et al. |
| 2014/0378606 A1* | 12/2014 | Roberts ............... C09D 11/107 524/547 |
| 2015/0015639 A1* | 1/2015 | Ito ....................... B41M 7/0018 347/21 |
| 2018/0258200 A1 | 9/2018 | Matsumoto |

FOREIGN PATENT DOCUMENTS

| | | |
|---|---|---|
| CN | 104194494 B | 8/2016 |
| JP | 2008-519868 A | 6/2008 |
| JP | 2013-124356 A | 6/2013 |
| JP | 2014-136777 A | 7/2014 |
| JP | 2016-41809 A | 3/2016 |
| JP | 2016-121237 A | 7/2016 |
| JP | 2017-43653 A | 3/2017 |
| WO | WO 99/52966 A1 | 10/1999 |
| WO | WO 00/64681 A1 | 11/2000 |
| WO | WO 03/097753 A1 | 11/2003 |

OTHER PUBLICATIONS

English translation of JP2014136777—Method for Producing Aqueous Pigment Dispersion Liquid and Aqueous Pigment Dispersion Liquid and Aqueous Ink for Inkjet Recording—(Year: 2020).*
Machine-generated English-language translation JP 2014/136777 A to Ochi et al.*
Machine-generated English-language translation of JP 2016/121237 A to Oda et al.*
Machine-generated English-language translation of JPH0967531A.*
International Search Report, issued in PCT/JP2017/028986, PCT/ISA/210, dated Oct. 3, 2017.
Extended European Search Report dated Mar. 6, 2020 for European Application No. 17839552.1.

* cited by examiner

*Primary Examiner* — Vu A Nguyen
(74) *Attorney, Agent, or Firm* — Birch, Stewart, Kolasch & Birch, LLP

(57) ABSTRACT

The present invention relates to a pigment water dispersion containing pigment-containing water-insoluble crosslinked polymer A particles, a water-soluble basic compound and water, in which a water-insoluble crosslinked polymer A constituting the particles has a carboxy group and a crosslinked structure containing an ester group derived from a water-insoluble crosslinking agent, a saponification value of the water-insoluble crosslinked polymer A is from 170 to 300 mgKOH/g, and the water-soluble basic compound contains a water-soluble amine compound; a process for producing the pigment water dispersion; a water-based ink for ink-jet printing which contains the pigment water dispersion; and an ink-jet printing method using the water-based ink.

20 Claims, No Drawings

AQUEOUS PIGMENT DISPERSION

FIELD OF THE INVENTION

The present invention relates to a pigment water dispersion, a process for producing the pigment water dispersion, a water-based ink for ink-jet printing which contains the pigment water dispersion, and an ink-jet printing method using the water-based ink.

BACKGROUND OF THE INVENTION

In ink-jet printing methods, droplets of ink are directly projected from very fine nozzles and allowed to adhere to a printing medium to obtain printed materials on which characters or images are printed. The ink-jet printing methods have become rapidly spread because of various advantages such as easiness of full coloration, low cost, capability of using a plain paper as the printing medium, capability of printing characters or images in a non-contact state to the material to be printed, etc. In particular, from the viewpoint of improving weathering resistance and water resistance of the resulting printed materials, the ink-jet printing methods using an ink containing a pigment as a colorant has become predominant.

In addition, with the recent progress of digital printing techniques, the ink-jet printing methods have also been employed in the commercial printing or industrial printing applications in the market in which the conventional analog printing techniques have been predominately used. Under such circumstances, it has been required to print characters or images on a low-water absorbing printing medium for high-speed commercial printing using a low-liquid absorbing coated paper such as an offset coated paper, for packaging container printing or film printing using a non-liquid absorbing resin film such as a polyvinyl chloride resin film, a polypropylene resin film and a polyester resin film, and for textile printing using synthetic fibers such as polyester fibers and nylon fibers, or natural fibers.

Furthermore, these inks used in the ink-jet printing methods have also been required to have very high storage stability, and exhibit very high water resistance, in particular, when used in the applications such as film printing and textile printing.

WO 2003/097753A (Patent Literature 1) aims at enhancing stability over time, ejection properties and rub fastness of inks, etc., and discloses an aqueous pigment dispersion obtained by compounding a water-soluble resin and a pigment, atomizing the pigment in a kneading step and a dispersing step, and further adding a resin having a urethane bond and/or an amide bond to the resulting mixture to subject the mixture to crosslinking treatment.

In addition, WO 1999/052966A (Patent Literature 2) discloses an aqueous pigment dispersion that is excellent in water resistance, etc., as well as stability over time, and is obtained by dispersing a pigment with a water-soluble or self-emulsifiable carboxyl group-containing thermoplastic resin, in which the thermoplastic resin is neutralized with an organic amine before dispersing the pigment therewith, and then crosslinked with a water-soluble crosslinking agent after dispersing the pigment therewith.

SUMMARY OF THE INVENTION

The present invention relates to a pigment water dispersion containing pigment-containing water-insoluble crosslinked polymer A particles, a water-soluble basic compound and water, in which a water-insoluble crosslinked polymer A constituting the particles has a carboxy group and a crosslinked structure containing an ester group derived from a water-insoluble crosslinking agent;

a saponification value of the water-insoluble crosslinked polymer A is not less than 170 mgKOH/g and not more than 300 mgKOH/g; and the water-soluble basic compound contains a water-soluble amine compound.

DETAILED DESCRIPTION OF THE INVENTION

Incidentally, in order to adapt for the aforementioned method of printing characters or images on the low-water absorbing printing medium, it is necessary that the ink used therein exhibits fast-drying performance on the printing medium. Therefore, there is generally employed the ink-jet printing method including a drying step in which a humectant having higher volatility than that in conventional inks is used. However, in the case where the ink present around openings of ink-ejection nozzles is dried when temporally stopping ejection of the ink therethrough, a flocculated thickened product of the ink tends to be produced around the openings of the ink-ejection nozzles, so that the nozzles tend to suffer from clogging. As a result, there tends to occur such a problem that even when subjecting an ink-jet printing head to purging operation, clogging of the nozzles tends to be hardly eliminated, so that droplets of the ink ejected tend to be deflected from a proper ejecting direction of the ink, and disturbance of the characters or images printed tends to be caused. For these reasons, it is required that even when the nozzles in an ink-jet printing apparatus temporally suffer from clogging with the ink, such clogging of the nozzles can be easily eliminated. Therefore, there is presently an increasing demand for inks that have excellent redispersibility so as to render a flocculated thickened product of the ink dispersible in the ink again by the next ink subsequently fed into the nozzles even when the previous ink is dried therein.

In the Patent Literature 1, since the amount of a carboxy group contained in the dispersed resin is small, the resulting ink has a low acid value, and therefore tends to be insufficient in redispersibility. Also, since an alkali metal is used as the neutralizing agent, the ink also tends to be insufficient in water resistance. In addition, in the Patent Literature 1, although there is the description concerning ejection properties of the ink, the evaluation has been mainly made with respect to clogging of the nozzles or formation of thin spots on printed characters or images when continuously printed on a specific number of sheets of printing paper. Thus, in the Patent Literature 1, the properties of the ink evaluated therein are different from the aforementioned redispersibility.

On the other hand, in the Patent Literature 2, since the resin is crosslinked with the water-soluble crosslinking agent, the resulting ink tends to be insufficient in storage stability, and it is therefore required to further improve properties of such an ink.

The present invention relates to a pigment water dispersion which can be used in a water-based ink that is capable of maintaining good redispersibility even when dried in ink-ejection nozzles, and from which a printed material having excellent water resistance as well as an ink having excellent storage stability are obtained; a process for producing the pigment water dispersion; a water-based ink for ink-jet printing which contains the pigment water dispersion; and an ink-jet printing method using the water-based ink.

Meanwhile, the term "printing" as used in the present specification means a concept that includes printing or typing operation for printing characters or images, and the term "printed material" as used in the present specification means a concept that includes printed matters or typed materials on which characters or images are printed. In addition, the term "low-water absorbing" as used in the present specification is intended to include both concepts of low-liquid absorbing properties and non-liquid absorbing properties, and the low-water absorbing printing medium means a printing medium having a water absorption of not less than 0 g/m² and not more than 10 g/m² as measured under the condition that a contact time between the printing medium and pure water is 100 milliseconds. Also, the term "water-based" as used herein means such a condition that water has a largest content among components of a medium contained in the ink.

The present inventors have found that when a pigment water dispersion containing pigment-containing water-insoluble crosslinked polymer particles, a specific water-soluble basic compound and water in which a water-insoluble crosslinked polymer constituting the particles has a specific structure and a saponification value of the water-insoluble crosslinked polymer is controlled to a specific range is used in a water-based ink, the resulting water-based ink is capable of maintaining good redispersibility when dried in ink-ejection nozzles, and it is possible to obtain a printed material having excellent water resistance and an ink having excellent storage stability therefrom.

That is, the present invention relates to the following aspects [1] to [4].

[1] A pigment water dispersion containing pigment-containing water-insoluble crosslinked polymer A particles, a water-soluble basic compound and water, in which a water-insoluble crosslinked polymer A constituting the particles has a carboxy group and a crosslinked structure containing an ester group derived from a water-insoluble crosslinking agent;

a saponification value of the water-insoluble crosslinked polymer A is not less than 170 mgKOH/g and not more than 300 mgKOH/g; and the water-soluble basic compound contains a water-soluble amine compound.

[2] A process for producing a pigment water dispersion containing pigment-containing water-insoluble crosslinked polymer A particles, a water-soluble basic compound and water, said process including:

Step I: subjecting a mixture containing a carboxy group-containing water-insoluble polymer A', a water-soluble basic compound and water to dispersion treatment to obtain a polymer dispersion;

Step II: adding a pigment to the polymer dispersion obtained in the step I and then subjecting the resulting mixture to dispersion treatment to obtain an aqueous pigment dispersion solution; and Step III: adding a water-insoluble crosslinking agent to the aqueous pigment dispersion solution obtained in the step II to subject the polymer to crosslinking treatment, thereby obtaining the pigment water dispersion, in which a saponification value of a water-insoluble crosslinked polymer A constituting the particles is not less than 170 mgKOH/g and not more than 300 mgKOH/g; and the water-soluble basic compound in the pigment water dispersion contains a water-soluble amine compound.

[3] A water-based ink for ink-jet printing containing the pigment water dispersion according to the above aspect [1], and a water-soluble organic solvent, in which the water-soluble organic solvent contains one or more organic solvents each having a boiling point of not lower than 90° C., and a boiling point of the water-soluble organic solvent as a weighted mean value of boiling points of the one or more organic solvents which are weighted by contents (% by mass) of the respective organic solvents is not higher than 250° C.

[4] An ink-jet printing method including the steps of:

ejecting the water-based ink for ink-jet printing according to the above aspect [3] by an ink-jet ejecting method to allow the water-based ink to adhere onto a printing medium; and then drying the printing medium onto which the water-based ink is adhered, at a temperature of not lower than 40° C.

According to the present invention, there are provided a pigment water dispersion which can be used in a water-based ink that is capable of maintaining good redispersibility even when dried in ink-ejection nozzles, and from which a printed material having excellent water resistance as well as an ink having excellent storage stability are obtained; a process for producing the pigment water dispersion; a water-based ink for ink-jet printing which contains the pigment water dispersion; and an ink-jet printing method using the water-based ink.

[Pigment Water Dispersion]

The pigment water dispersion of the present invention contains particles of a water-insoluble crosslinked polymer A containing a pigment (hereinafter also referred to merely as "pigment-containing crosslinked polymer A particles"), a water-soluble basic compound and water, in which a water-insoluble crosslinked polymer A constituting the particles (hereinafter also referred to merely as a "crosslinked polymer A") has a carboxy group and a crosslinked structure containing an ester group derived from a water-insoluble crosslinking agent; a saponification value of the crosslinked polymer A is not less than 170 mgKOH/g and not more than 300 mgKOH/g; and the water-soluble basic compound contains a water-soluble amine compound.

The configuration of the pigment-containing crosslinked polymer A particles present in the pigment water dispersion and the water-based ink is preferably such a pigment-enclosing configuration in which the pigment is enclosed or encapsulated in the polymer, from the viewpoint of improving dispersion stability of the pigment.

The pigment water dispersion of the present invention may be suitably used in water-based inks, e.g., those water-based inks for flexographic printing, for gravure printing or for ink-jet printing. Of these applications of the pigment water dispersion in water-based inks, in view of the fact that the resulting inks are excellent in redispersibility when dried, the pigment water dispersion of the present invention is preferably used in water-based inks for ink-jet printing. Furthermore, when using the pigment water dispersion of the present invention in water-based inks, the resulting water-based inks can exhibit excellent redispersibility when dried, and it is possible to provide printed materials having excellent water resistance. Therefore, the pigment water dispersion of the present invention can be suitably used in water-based inks for ink-jet textile printing in which synthetic fibers such as low-water absorbing polyesters and nylons, etc., or natural fibers are used as a material for a printing medium.

Meanwhile, the "carboxy group" as used in the present invention is intended to include a deprotonated carboxylic acid ion. Also, the "saponification value" as used in the present invention is expressed by the number of milligrams of potassium hydroxide required to saponify 1 g of a polymer, and corresponds to a sum of an acid value and an ester value of the polymer. The saponification value may be measured by a testing method using a neutralization titration method according to JIS-K-0070.

The pigment water dispersion of the present invention can exhibit such a special effect that when using the pigment water dispersion in a water-based ink, the resulting water-based ink is capable of maintaining good redispersibility even when dried in ink-ejection nozzles (hereinafter also referred to merely as "redispersibility"), and it is also possible to achieve excellent water resistance of a printed material produced using the ink (hereinafter also referred to merely as "water resistance") and excellent storage stability of the ink. The reason why the aforementioned advantageous effect can be attained by the present invention is considered as follows though it is not clearly determined yet.

In the pigment water dispersion of the present invention, the water-insoluble crosslinked polymer constituting the pigment-containing crosslinked polymer particles is neutralized with the water-soluble basic compound containing the water-soluble amine compound, so that the water-soluble amine compound is partially or wholly volatilized from the ink obtained therefrom in the drying step after printing characters or images on a printing medium. As a result, it is considered that the pigment-containing crosslinked polymer particles are inhibited from being scattered or dispersed in water on the printing medium, and flocculation of the particles is therefore promoted on the printing medium, so that a firm film of the polymer is formed on the printing medium, and the resulting printed material can be improved in water resistance.

The saponification value is an index of a total amount of a carboxy group and an ester group, and represents an intensity of a synergistic effect between a charge repulsion effect by the carboxy group and an effect of inhibiting desorption of the water-insoluble crosslinked polymer from a surface of the pigment by suppressing a free movement of the polymer chain adsorbed on the surface of the pigment owing to the crosslinked structure containing the ester group. When the saponification value of the water-insoluble crosslinked polymer lies within the range of not less than 170 mgKOH/g and not more than 300 mgKOH/g, the aforementioned charge repulsion effect and the aforementioned desorption-inhibiting effect act synergistically. For this reason, it is considered that the resulting ink can be improved in storage stability, and in the case where the pigment-containing crosslinked polymer particles are flocculated owing to drying of the ink in ink-ejection nozzles in an ink-jet printing apparatus, the particles in the ink can be kept in such a state that they are easily dispersed in water without excessive flocculation thereof, so that the ink can exhibit good redispersibility by the action of an ink vehicle contained in the remaining ink or a next ink subsequently fed thereto, and the nozzles can be prevented from suffering from clogging with the dried ink.

Furthermore, it is considered that by subjecting the water-insoluble polymer having good dispersibility in water to crosslinking treatment with the water-insoluble crosslinking agent, the crosslinking reaction of the polymer can proceed efficiently in an aqueous medium containing water as a main component, and a crosslinked moiety of the water-insoluble crosslinked polymer is rendered hydrophobic, so that the water-insoluble crosslinked polymer is prevented from suffering from swelling with water (intrusion of water into the crosslinked polymer) and can be further improved in storage stability in the ink.

<Pigment>

In the present invention, from the viewpoint of improving the aforementioned redispersibility, water resistance and storage stability of the ink, the pigment is contained in the ink in the form of the pigment-containing crosslinked polymer particles.

The pigment used in the present invention may be either an inorganic pigment or an organic pigment, and may also be in the form of a lake pigment or a fluorescent pigment. In addition, the pigment may also be used in combination with an extender pigment, if required.

Specific examples of the inorganic pigment include carbon blacks, metal oxides such as titanium oxide, iron oxide, red iron oxide and chromium oxide, and pearlescent pigments. In particular, carbon blacks are preferably used for black inks. The carbon blacks may include furnace blacks, thermal lamp blacks, acetylene blacks and channel blacks.

Specific examples of the organic pigment include azo pigments such as azo lake pigments, insoluble monoazo pigments, insoluble disazo pigments and chelate azo pigments; and polycyclic pigments such as phthalocyanine pigments, perylene pigments, perinone pigments, anthraquinone pigments, quinacridone pigments, dioxazine pigments, thioindigo pigments, isoindolinone pigments, quinophthalone pigments, diketopyrrolopyrrole pigments, benzimidazolone pigments and threne pigments.

The hue of the organic pigment used in the present invention is not particularly limited, and there may be used any chromatic pigment having a yellow color, a magenta color, a cyan color, a blue color, a red color, an orange color, a green color, etc.

Specific examples of the preferred organic pigments include one or more pigments selected from the group consisting of commercially available products marketed under the names of C.I. Pigment Yellow, C.I. Pigment Red, C.I. Pigment Orange, C.I. Pigment Violet, C.I. Pigment Blue and C.I. Pigment Green, etc., with various part numbers.

Examples of the extender pigment include silica, calcium carbonate and talc.

The aforementioned pigments may be used alone or in the form of a mixture of any two or more thereof.

<Water-Insoluble Crosslinked Polymer A>

The water-insoluble crosslinked polymer A (crosslinked polymer A) constituting the pigment-containing crosslinked polymer A particles used in the present invention has a carboxy group and a crosslinked structure containing an ester group derived from a water-insoluble crosslinking agent, in which a saponification value of the aforementioned crosslinked polymer A is not less than 170 mgKOH/g and not more than 300 mgKOH/g. The crosslinked polymer A has not only a function as a pigment dispersant capable of exhibiting the effect of dispersing the pigment in the dispersion, but also a function as a fixing agent for fixing the pigment on a printing medium.

The crosslinked polymer A is produced by subjecting a carboxy group-containing water-insoluble polymer A' (hereinafter also referred to merely as a polymer A') to crosslinking treatment. In the crosslinking treatment, at least a part of the carboxy groups contained in the polymer A' are neutralized with a water-soluble basic compound containing a water-soluble amine compound, and thereby formed into a deprotonated carboxylic acid ion. And, the at least part of the carboxy groups contained in the polymer A' are crosslinked with the water-insoluble crosslinking agent, so that the resulting polymer has a crosslinked structure containing an ester group derived from the water-insoluble crosslinking agent.

In the present invention, by neutralizing the polymer A', the charge repulsion effect on the particles owing to the carboxylic acid ion produced after the neutralization can be increased, so that the pigment water dispersion or the water-based ink can be prevented from being thickened or flocculated together upon storage thereof, and redispersibility of the dried ink as well as storage stability of the ink can be improved. In addition, when the carboxy group of the polymer A' is reacted with the water-insoluble crosslinking agent, the free movement of the polymer chain adsorbed onto the surface of the pigment is suppressed and the effect of inhibiting desorption of the crosslinked polymer A from the surface of the pigment can be increased, so that the redispersibility of the dried ink and the storage stability of the ink can be improved.

In addition, since the hydrophobic crosslinked structure is formed in the water-insoluble crosslinked polymer, swelling of the water-insoluble crosslinked polymer with water (intrusion of water into the crosslinked polymer) can be suppressed, so that the resulting ink can be further improved in storage stability.

Furthermore, by using the water-soluble basic compound containing the water-soluble amine compound upon conducting the aforementioned neutralization, the water-soluble amine compound is partially or wholly volatilized from the resulting ink after printing characters or images on a printing medium, and cohesion between the pigment-containing crosslinked polymer A particles on the printing medium can be promoted, so that a firm film of the polymer can be formed on the printing medium, and the resulting printed material can be improved in water resistance.

The polymer A' as used in the present invention means the water-insoluble polymer prior to the crosslinking treatment, whereas the crosslinked polymer A as used herein means the polymer obtained after subjecting the water-insoluble polymer A' to the crosslinking treatment. The polymer A' is maintained in a water-insoluble state not only surely in a non-neutralized condition, but also even after neutralizing a part of the carboxy groups of the polymer. The term "water-insoluble" in the water-insoluble polymer as used herein means that a water dispersion of the polymer does not become transparent. On the other hand, even if the water dispersion of the polymer looks to be transparent when visually observed, in the case where Tyndall phenomenon is recognized in the water dispersion when observed under irradiation with laser light or ordinary light, the polymer is regarded as being water-insoluble.

Examples of the polymer A' include at least one polymer selected from the group consisting of polyesters, polyurethanes and vinyl-based polymers. Among these polymers, from the viewpoint of improving storage stability of the ink, preferred are vinyl-based polymers obtained by addition-polymerizing a vinyl monomer selected from a vinyl compound, a vinylidene compound, a vinylene compound and the like.

The vinyl-based polymer as the polymer A' used in the present invention preferably contains a constitutional unit derived from (a-1) a carboxy group-containing monomer (hereinafter also referred to merely as a "component (a-1)") and a constitutional unit derived from (a-2) a hydrophobic monomer (hereinafter also referred to merely as a "component (a-2)"). The vinyl-based polymer may further contain a constitutional unit derived from (a-3) a hydrophilic monomer (hereinafter also referred to merely as a "component (a-3)"). The vinyl-based polymer is produced by copolymerizing a monomer mixture containing the component (a-1) and the component (a-2) which may further contain the component (a-3), if required (hereinafter also referred to merely as a "monomer mixture").

[(a-1) Carboxy Group-Containing Monomer]

The carboxy group-containing monomer (a-1) is used as a monomer component of the polymer A' from the viewpoint of improving redispersibility, water resistance and storage stability of the ink. As the carboxy group-containing monomer (a-1), there may be used carboxylic acid monomers.

Specific examples of the carboxylic acid monomers include (meth)acrylic acid, crotonic acid, itaconic acid, maleic acid, fumaric acid, citraconic acid and 2-methacryloyloxymethylsuccinic acid. Among these carboxylic acid monomers, preferred is (meth)acrylic acid, and more preferred is acrylic acid.

Meanwhile, the term "(meth)acrylic acid" as used in the present invention means at least one compound selected from the group consisting of acrylic acid and methacrylic acid. The term "(meth)acrylic acid" is hereinafter defined in the same way.

[(a-2) Hydrophobic Monomer]

The hydrophobic monomer (a-2) is preferably used as a monomer component of the polymer A' from the viewpoint of improving redispersibility, water resistance and storage stability of the ink. The hydrophobic monomer (a-2) is such a monomer having a solubility in water of less than 10 g as measured by dissolving the monomer in 100 g of ion-exchanged water at 25° C. The solubility in water of the hydrophobic monomer (a-2) as measured by dissolving the monomer in 100 g of ion-exchanged water at 25° C. is preferably not more than 5 g and more preferably not more than 1 g from the viewpoint of improving adsorptivity of the polymer onto the surface of the pigment.

As the hydrophobic monomer, there may be mentioned an aromatic group-containing monomer, a (meth)acrylate containing a hydrocarbon group derived from an aliphatic alcohol, an aromatic group-containing monomer-based macromonomer and the like.

Meanwhile, the term "(meth)acrylate" as used in the present invention means at least one compound selected from the group consisting of an acrylate and a methacrylate. The term "(meth)acrylate" is hereinafter defined in the same way.

The aromatic group-containing monomer is preferably a vinyl monomer containing an aromatic group having not less than 6 and not more than 22 carbon atoms which may contain a substituent group containing a hetero atom, and more preferably at least one monomer selected from the group consisting of a styrene-based monomer and an aromatic group-containing (meth)acrylate. As the aromatic group-containing monomer, the styrene-based monomer may be used in combination with the aromatic group-containing (meth)acrylate. The molecular weight of the aromatic group-containing monomer is preferably less than 500.

The styrene-based monomer is preferably at least one monomer selected from the group consisting of styrene, 2-methyl styrene, α-methyl styrene, vinyl toluene and divinyl benzene, more preferably at least one monomer selected from the group consisting of styrene, 2-methyl styrene and α-methyl styrene, even more preferably at least one monomer selected from the group consisting of styrene and α-methyl styrene, and further even more preferably a combination of styrene and α-methyl styrene.

In addition, the aromatic group-containing (meth)acrylate is preferably selected from phenyl (meth)acrylate, benzyl (meth)acrylate, phenoxyethyl (meth)acrylate, etc., and is more preferably benzyl (meth)acrylate.

As the (meth)acrylate containing a hydrocarbon group derived from an aliphatic alcohol, preferred are those (meth)acrylates containing a hydrocarbon group derived from an aliphatic alcohol having not less than 1 and not more than 22 carbon atoms, more preferred are those (meth)acrylates containing an alkyl group having not less than 1 and not more than 22 carbon atoms, and even more preferred are those (meth)acrylates containing an alkyl group having not less than 6 and not more than 18 carbon atoms.

Examples of the (meth)acrylate containing a hydrocarbon group derived from an aliphatic alcohol include (meth)acrylates containing a linear alkyl group, such as methyl (meth)acrylate, ethyl (meth)acrylate, propyl (meth)acrylate, butyl (meth)acrylate, pentyl (meth)acrylate, octyl (meth)acrylate, decyl (meth)acrylate, dodecyl (meth)acrylate and stearyl (meth)acrylate; (meth)acrylates containing a branched alkyl group, such as isopropyl (meth)acrylate, isobutyl (meth)acrylate, ter-butyl(meth)acrylate, isoamyl (meth)acrylate, isooctyl (meth)acrylate, isodecyl (meth)acrylate, isododecyl (meth)acrylate, isostearyl (meth)acrylate and 2-ethylhexyl (meth)acrylate; and (meth)acrylates containing an alicyclic alkyl group, such as cyclohexyl (meth)acrylate.

As the hydrophobic monomer, there may be used an aromatic group-containing monomer-based macromonomer. The macromonomer is in the form of a compound containing a polymerizable functional group at one terminal end thereof and having a number-average molecular weight of not less than 500 and not more than 100,000, and is preferably used as a monomer component of the polymer A' from the viewpoint of improving redispersibility, water resistance and storage stability of the ink. The polymerizable functional group bonded to one terminal end of the macromonomer is preferably an acryloyloxy group or a methacryloyloxy group and more preferably a methacryloyloxy group.

The macromonomer preferably has a number-average molecular weight of not less than 1,000 and not more than 10,000.

Meanwhile, the number-average molecular weight may be measured by gel permeation chromatography using chloroform containing 1 mmol/L of dodecyl dimethylamine as a solvent and using monodisperse polystyrene having a known molecular weight as a reference standard substance.

Examples of an aromatic group-containing monomer constituting the aromatic group-containing monomer-based macromonomer include those aromatic group-containing monomers as described above. Among these aromatic group-containing monomers, preferred are styrene and benzyl (meth)acrylate, and more preferred is styrene.

Specific examples of commercially available products of the styrene-based macromonomer include "AS-6(S)", "AN-6(S)" and "HS-6(S)" (tradenames) all available from Toagosei Co., Ltd., etc.

In addition, from the viewpoint of improving redispersibility, water resistance and storage stability of the ink, as the other macromonomer, there may be used a silicone-based macromonomer. Examples of the silicone-based macromonomer include organopolysiloxanes containing a polymerizable functional group bonded to one terminal end thereof, etc.

Among these monomers, as the hydrophobic monomer (a-2), preferred is at least one monomer selected from the group consisting of the styrene-based monomer, the aromatic group-containing (meth)acrylate and the aromatic group-containing monomer-based macromonomer; more preferred is at least one monomer selected from the group consisting of the styrene-based monomer and the aromatic group-containing (meth)acrylate; even more preferred is the styrene-based monomer; further even more preferred is at least one monomer selected from the group consisting of styrene, 2-methyl styrene and α-methyl styrene; still further even more preferred is at least one monomer selected from the group consisting of styrene and α-methyl styrene; and furthermore preferred is a combination of styrene and α-methyl styrene.

[(a-3) Hydrophilic Monomer]

From the viewpoint of improving redispersibility, water resistance and storage stability of the ink, the hydrophilic monomer (a-3) may be further used as a monomer component of the polymer A'. More specifically, the polymer A' may further contain a constitutional unit derived from the hydrophilic monomer (a-3).

The hydrophilic monomer (a-3) is preferably at least one monomer selected from the group consisting of hydroxyalkyl (meth)acrylates such as 2-hydroxyethyl (meth)acrylate and 3-hydroxypropyl (meth)acrylate, polyalkylene glycol (meth)acrylates such as polyethylene glycol (n=2 to 30 wherein n represents an average molar number of addition of oxyalkylene groups: hereinafter defined in the same way) (meth)acrylate and polypropylene glycol (n=2 to 30) (meth)acrylate, alkoxy polyalkylene glycol (meth)acrylates such as methoxy polyethylene glycol (n=1 to 30) (meth)acrylate and aralkoxy polyalkylene glycols (meth)acrylates such as phenoxy (ethylene glycol/propylene glycol copolymer) (n=1 to 30 in which n for ethylene glycol: n=1 to 29) (meth)acrylate; more preferably at least one monomer selected from the group consisting of polyalkylene glycol (meth)acrylates, alkoxy polyalkylene glycol (meth)acrylates and aralkoxy polyalkylene glycol (meth)acrylates; even more preferably at least one monomer selected from the group consisting of polypropylene glycol (n=2 to 30) (meth)acrylate and phenoxy (ethylene glycol/propylene glycol copolymer) (meth)acrylate; and further even more preferably polypropylene glycol (n=2 to 30) (meth)acrylate.

Specific examples of commercially available products of the component (a-3) include "NK ESTER M-20G", "NK ESTER M-40G", "NK ESTER M-90G", "NK ESTER M-230G" and the like (the foregoing are tradenames for products available from Shin-Nakamura Chemical Co., Ltd.); and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like (the foregoing are tradenames for products available from NOF Corporation).

The aforementioned components (a-1) to (a-3) may be respectively used alone or in the form of a mixture of any two or more thereof.

The polymer A' is preferably a vinyl-based polymer containing a constitutional unit derived from the carboxy group-containing monomer (a-1) such as (meth)acrylic acid, and a constitutional unit derived from the at least one hydrophobic monomer (a-2) selected from the group consisting of an aromatic group-containing monomer, a (meth)acrylate containing a hydrocarbon group derived from an aliphatic alcohol having not less than 1 and not more than 22 carbon atoms, and an aromatic group-containing monomer-based macromonomer. The polymer A' may also be a vinyl polymer that further contains a constitutional unit derived from the hydrophilic monomer (a-3) in addition to the aforementioned constitutional units.

(Contents of Respective Components in Monomer Mixture or Contents of Respective Constitutional Units in Water-Insoluble Polymer A')

The contents of the aforementioned components (a-1) and (a-2) in the monomer mixture (contents of non-neutralized components; hereinafter defined in the same way) upon production of the polymer A', or the contents of the constitutional units derived from the components (a-1) and (a-2) in the polymer A' are as follows, from the viewpoint of improving redispersibility, water resistance and storage stability of the ink.

The content of the component (a-1) is preferably not less than 10% by mass, more preferably not less than 15% by mass, even more preferably not less than 18% by mass, further even more preferably not less than 23% by mass and still further even more preferably not less than 26% by mass, and is also preferably not more than 70% by mass, more preferably not more than 60% by mass, even more preferably not more than 50% by mass, further even more preferably not more than 45% by mass, still further even more preferably not more than 35% by mass and furthermore preferably not more than 32% by mass.

The content of the component (a-2) is preferably not less than 30% by mass, more preferably not less than 40% by mass, even more preferably not less than 50% by mass, further even more preferably not less than 55% by mass, still further even more preferably not less than 65% by mass and furthermore preferably not less than 68% by mass, and is also preferably not more than 90% by mass, more preferably not more than 85% by mass, even more preferably not more than 82% by mass, further even more preferably not more than 77% by mass and still further even more preferably not more than 74% by mass.

In the case of further including the component (a-3), the contents of the aforementioned components (a-1) to (a-3) in the monomer mixture upon production of the polymer A', or the contents of the constitutional units derived from the components (a-1) to (a-3) in the polymer A' are as follows, from the viewpoint of improving redispersibility, water resistance and storage stability of the ink.

The content of the component (a-1) is preferably not less than 10% by mass, more preferably not less than 15% by mass, even more preferably not less than 20% by mass, further even more preferably not less than 25% by mass and still further even more preferably not less than 26% by mass, and is also preferably not more than 70% by mass, more preferably not more than 60% by mass, even more preferably not more than 50% by mass, further even more preferably not more than 45% by mass, still further even more preferably not more than 35% by mass and furthermore preferably not more than 32% by mass.

The content of the component (a-2) is preferably not less than 25% by mass, more preferably not less than 30% by mass, even more preferably not less than 35% by mass, further even more preferably not less than 45% by mass and still further even more preferably not less than 50% by mass, and is also preferably not more than 85% by mass, more preferably not more than 78% by mass and even more preferably not more than 75% by mass.

In the case of further including the component (a-3), the content of the component (a-3) is preferably not more than 30% by mass, more preferably not more than 25% by mass, even more preferably not more than 20% by mass, further even more preferably not more than 15% by mass, still further even more preferably not more than 10% by mass and furthermore preferably not more than 5.0% by mass.

The mass ratio of the component (a-1) to the component (a-2) [component (a-1)/component (a-2)] is preferably not less than 0.05, more preferably not less than 0.15, even more preferably not less than 0.25 and further even more preferably not less than 0.30, and is also preferably not more than 1.2, more preferably not more than 0.80, even more preferably not more than 0.60 and further even more preferably not more than 0.50.

In the case of further including the component (a-3), the mass ratio of the component (a-3) to a sum of the component (a-1) and the component (a-2) [component (a-3)/[component (a-1)+component (a-2)]] is preferably not more than 0.4, more preferably not more than 0.25 and even more preferably not more than 0.10.

(Production of Water-Insoluble Polymer A')

The polymer A' may be produced by copolymerizing the aforementioned monomer mixture by conventionally known polymerization methods such as bulk polymerization, solution polymerization, suspension polymerization and emulsion polymerization. Among these polymerization methods, preferred is the solution polymerization method.

The solvent used in the solution polymerization method is not particularly limited, and is preferably an organic polar solvent. If the organic polar solvent is miscible with water, the organic polar solvent may be used in the form of a mixture with water. Examples of the organic polar solvent include aliphatic alcohols having not less than 1 and not more than 3 carbon atoms; ketones having not less than 3 and not more than 8 carbon atoms; ethers; and esters such as ethyl acetate. Among these organic polar solvents, preferred is methanol, ethanol, acetone, methyl ethyl ketone or a mixed solvent of at least one of these compounds with water, and more preferred is methyl ethyl ketone or a mixed solvent of methyl ethyl ketone and water.

The polymerization may be carried out in the presence of a polymerization initiator or a chain transfer agent.

Examples of the polymerization initiator include conventionally known radical polymerization initiators, e.g., azo compounds such as 2,2'-azobisisobutyronitrile and 2,2'-azobis(2,4-dimethylvaleronitrile), and organic peroxides such as t-butyl peroxyoctoate and benzoyl peroxide. The amount of the radical polymerization initiator used in the polymerization is preferably not less than 0.001 mol and more preferably not less than 0.01 mol per 1 mol of the monomer mixture, and is also preferably not more than 5 mol and more preferably not more than 2 mol per 1 mol of the monomer mixture.

Examples of the chain transfer agent include conventionally known chain transfer agents, e.g., mercaptans such as octyl mercaptan and 2-mercapto ethanol, and thiuram disulfides.

In addition, the type of a polymerization chain of the monomer polymerized is not particularly limited, and may be of any of a random type, a block type and a graft type, etc.

The preferred polymerization conditions may vary depending upon the kinds of polymerization initiators, monomers and solvents used, etc. In general, the polymerization temperature is preferably not lower than 30° C. and more preferably not lower than 50° C., and is also preferably not higher than 95° C. and more preferably not higher than 80° C. The polymerization time is preferably not less than 1 hour and more preferably not less than 2 hours, and is also preferably not more than 20 hours and more preferably not more than 10 hours. Furthermore, the polymerization is preferably conducted in a nitrogen gas atmosphere or an atmosphere of an inert gas such as argon.

After completion of the polymerization reaction, the polymer A' produced may be isolated from the obtained reaction solution by known methods such as reprecipitation and removal of the solvent by distillation. In addition, the resulting polymer A' may be purified by removing the unreacted monomers, etc., from the reaction solution by reprecipitation, membrane separation, chromatography, extraction, etc.

In the present invention, as the method of dispersing the pigment using the polymer A', any optional conventionally known methods may be used. However, the dispersing method capable of forming the below-mentioned water dispersion of the polymer A' particles containing the pigment (hereinafter also referred to merely as "pigment-containing polymer A' particles") is preferably employed. From the viewpoint of enhancing productivity of the water dispersion of the pigment-containing polymer A' particles, the solution of the polymer A' obtained after the polymerization reaction may be directly used as such without removing the organic solvent used in the polymerization reaction therefrom in order to use the organic solvent as an organic solvent for the below-mentioned step I.

The concentration of non-volatile components in the solution of the polymer A' (solid content of the polymer solution) is preferably not less than 30% by mass and more preferably not less than 40% by mass, and is also preferably not more than 70% by mass and more preferably not more than 65% by mass, from the viewpoint of enhancing productivity of the water dispersion of the pigment-containing polymer A' particles.

The weight-average molecular weight of the polymer A' is preferably not less than 3,000, more preferably not less than 6,000 and even more preferably not less than 10,000, and is also preferably not more than 100,000, more preferably not more than 80,000, even more preferably not more than 50,000, further even more preferably not more than 30,000 and still further even more preferably not more than 20,000. When the molecular weight of the polymer A' lies within the aforementioned range, the polymer A' has sufficient adsorption to the pigment, and the resulting dispersion can exhibit good dispersion stability.

The number-average molecular weight of the polymer A' is preferably not less than 2,000, more preferably not less than 3,000 and even more preferably not less than 4,000, and is also preferably not more than 20,000, more preferably not more than 15,000, even more preferably not more than 10,000 and further even more preferably not more than 6,000.

Meanwhile, the weight-average molecular weight and the number-average molecular weight may be measured by the method described in Examples below.

<Water-Soluble Basic Compound>

The pigment water dispersion of the present invention contains a water-soluble basic compound as a neutralizing agent from the viewpoint of improving redispersibility, water resistance and storage stability of the ink, and the water-soluble basic compound to be compounded in the pigment water dispersion contains a water-soluble amine compound.

The "water-soluble" of the water-soluble basic compound as used in the present invention means that the solubility in water of the compound as measured by dissolving the compound in 100 g of water at 25° C. (hereinafter also referred to merely as "water solubility") is not less than 5 g/100 gH$_2$O. For example, the water solubility of triethylamine as measured at 25° C. is 9 g/100 gH$_2$O, the water solubility of N,N-dimethyl ethanolamine as measured at 25° C. is 95.4 g/100 gH$_2$O, the water solubility of N-methyl diethanolamine as measured at 25° C. is 100 g/100 gH$_2$O, and the water solubility of triethanolamine as measured at 25° C. is 100 g/100 gH$_2$O.

The content of the water-soluble amine compound in the water-soluble basic compound is preferably not less than 50 mol %, more preferably not less than 70 mol %, even more preferably not less than 80 mol %, further even more preferably not less than 90 mol %, still further even more preferably not less than 95 mol %, furthermore preferably not less than 98 mol %, even furthermore preferably substantially 100 mol %, and still even furthermore preferably 100 mol % from the viewpoint of improving redispersibility, water resistance and storage stability of the ink.

The number of carbon atoms in the water-soluble amine compound is preferably not less than 2 and more preferably not less than 3 from the viewpoint of improving redispersibility, water resistance and storage stability of the ink, and is also preferably not more than 8 and more preferably not more than 6 from the same viewpoint as described above.

The boiling point of the water-soluble amine compound is preferably not lower than 85° C., more preferably not lower than 100° C., even more preferably not lower than 150° C., further even more preferably not lower than 180° C. and still further even more preferably not lower than 200° C. from the viewpoint of improving redispersibility and storage stability of the ink, and is also preferably not higher than 350° C., more preferably not higher than 300° C. and even more preferably not higher than 280° C. from the viewpoint of improving water resistance of the resulting printed material.

Among these water-soluble amine compounds, from the viewpoint of improving redispersibility, water resistance and storage stability of the ink, preferred is an alkanolamine having not less than 2 and not more than 8 carbon atoms, more preferred is a tertiary alkanolamine, and even more preferred is a tertiary ethanolamine.

Specific examples of the water-soluble amine compound include trialkylamines having not less than 3 and not more than 8 carbon atoms, such as triethylamine; and water-miscible alkanolamines having not less than 2 and not more than 8 carbon atoms, e.g., primary alkanolamines such as monoethanolamine, monopropanolamine and monobutanolamine; secondary alkanolamines such as N-methyl ethanolamine, N-ethyl ethanolamine, N-methyl propanolamine, diethanolamine and diisopropanolamine; and tertiary alkanolamines such as N,N-dimethyl ethanolamine, N,N-dimethyl propanolamine, N,N-diethyl ethanolamine, N-ethyl diethanolamine, N-methyl diethanolamine, triethanolamine and triisopropanolamine.

Among these water-soluble amine compounds, preferred is at least one compound selected from the group consisting of N methyl diethanolamine (boiling point (b.p.): 247° C.), N,N-dimethyl ethanolamine (b.p.: 135° C.), diethanolamine (b.p.: 269° C.) and triethanolamine (b.p.: 335° C.); more preferred is at least one compound selected from the group consisting of N-methyl diethanolamine, N,N-dimethyl ethanolamine and triethanolamine; and even more preferred is N-methyl diethanolamine.

Meanwhile, these water-soluble basic compounds may be used alone or in the form of a mixture of any two or more thereof.

The water-soluble basic compound used in the present invention may also contain the other water-soluble basic compound than the water-insoluble amine compound unless the advantageous effects of the present invention are adversely affected by inclusion thereof. As the other water-soluble basic compound than the water-soluble amine compound, there may be used alkali metal hydroxides. Examples of the alkali metal hydroxides include lithium hydroxide, sodium hydroxide, potassium hydroxide and cesium hydroxide. Of these alkali metal hydroxides, preferred are sodium hydroxide and potassium hydroxide.

The water-soluble basic compound may be used in the form of an aqueous solution thereof from the viewpoint of sufficiently and uniformly accelerating neutralization of the polymer. From the same viewpoint as described above, the concentration of the aqueous solution of the water-soluble basic compound is preferably not less than 3% by mass, more preferably not less than 10% by mass and even more preferably not less than 15% by mass, and is also preferably not more than 50% by mass and more preferably not more than 25% by mass.

The content of the other water-soluble basic compound than the water-soluble amine compound in the whole water-soluble basic compound is preferably not more than 50 mol %, more preferably not more than 30 mol %, even more preferably not more than 20 mol %, further even more preferably not more than 10 mol %, still further even more preferably not more than 5 mol %, furthermore preferably not more than 2 mol %, even furthermore preferably substantially 0 mol %, and still even furthermore preferably 0 mol %.

<Water-Insoluble Crosslinking Agent>

The crosslinking agent used in the present invention is water-insoluble from the viewpoint of allowing the crosslinking agent to efficiently react with the carboxy groups contained in the polymer A' in an aqueous medium containing water as a main component. The term "water-insoluble" in the water-insoluble crosslinking agent as used herein means that the solubility in water of the water-insoluble crosslinking agent as measured by dissolving the crosslinking agent in 100 g of water at 25° C. is preferably not more than 50 g, more preferably not more than 40 g and even more preferably not more than 35 g.

In addition, from the viewpoint of improving redispersibility, water resistance and storage stability of the ink, the water solubility rate of the water-insoluble crosslinking agent is preferably not more than 50% by mass, more preferably not more than 40% by mass and even more preferably not more than 35% by mass. The "water solubility rate" as used herein means a rate (% by mass) of dissolution of the water-insoluble crosslinking agent as measured by dissolving 10 parts by mass of the crosslinking agent in 90 parts by mass of ion-exchanged water at 25° C. as room temperature. More specifically, the water solubility rate may be measured by the method described in Examples below.

The water-insoluble crosslinking agent is preferably a polyfunctional epoxy compound from the viewpoint of allowing the crosslinking agent to efficiently react with the carboxy groups contained in the polymer A' in an aqueous medium containing water as a main component.

The number of epoxy groups contained per one molecule of the polyfunctional epoxy compound is not less than 2, and is also preferably not more than 6, from the viewpoint of allowing the epoxy compound to efficiently react with the carboxy groups of the polymer as well as from the viewpoint of improving redispersibility, water resistance and storage stability of the ink, and more preferably not more than 4 and even more preferably not more than 3 from the viewpoint of attaining good availability of the compound in the market.

The polyfunctional epoxy compound is preferably a compound containing not less than 2 glycidyl ether groups, more preferably a compound containing not less than 2 glycidyl ether groups derived from a polyhydric alcohol containing a hydrocarbon group having not less than 3 and not more than 8 carbon atoms, even more preferably a compound containing not less than 2 and not more than 3 glycidyl ether groups derived from a polyhydric alcohol containing a hydrocarbon group having not less than 3 and not more than 8 carbon atoms, and further even more preferably a compound containing not less than 2 and not more than 3 glycidyl ether groups derived from a polyhydric alcohol containing a hydrocarbon group having not less than 3 and not more than 6 carbon atoms.

The molecular weight of the polyfunctional epoxy compound is preferably not less than 120, more preferably not less than 150 and even more preferably not less than 200, and is also preferably not more than 2,000, more preferably not more than 1,500, even more preferably not more than 1,000 and further even more preferably not more than 500, from the viewpoint of facilitating the crosslinking reaction and improving storage stability of the ink.

Specific examples of the polyfunctional epoxy compound include polyglycidyl ethers such as polypropylene glycol diglycidyl ether (water solubility rate: 31% by mass), glycerol diglycidyl ether, glycerol polyglycidyl ether, polyglycerol polyglycidyl ether, trimethylolpropane polyglycidyl ether (water solubility rate: 27% by mass), sorbitol polyglycidyl ether, pentaerythritol polyglycidyl ether, resorcinol diglycidyl ether, neopentyl glycol diglycidyl ether, 1,6-hexanediol diglycidyl ether and hydrogenated bisphenol A-type diglycidyl ether.

Of these polyfunctional epoxy compounds, preferred is at least one compound selected from the group consisting of trimethylolpropane polyglycidyl ether (water solubility rate: 27% by mass), 1,6-hexanediol diglycidyl ether (water solubility rate: 0% by mass) and pentaerythritol polyglycidyl ether (water solubility rate: 0% by mass); more preferred is at least one compound selected from the group consisting of trimethylolpropane polyglycidyl ether and 1,6-hexanediol diglycidyl ether. Furthermore, from the viewpoint of suppressing increase in viscosity of the ink upon increasing a concentration of the ink when using the polyfunctional epoxy compound in the ink, the polyfunctional epoxy compound is even more preferably trimethylolpropane polyglycidyl ether.

[Process for Producing Pigment Water Dispersion]

The water-insoluble crosslinked polymer A particles containing the pigment (pigment-containing crosslinked polymer A particles) can be efficiently produced in the form of a pigment water dispersion thereof by the process including the following steps I to III. Incidentally, the water-soluble basic compound may be added not only in the step I, but also further in the steps other than the step I. However, in any case, the water-soluble basic compound contained in the finally obtained pigment water dispersion contains the water-soluble amine compound.

Step I: subjecting a mixture containing the carboxy group-containing water-insoluble polymer A', the water-soluble basic compound and water to dispersion treatment to obtain a polymer dispersion;

Step II: adding the pigment to the polymer dispersion obtained in the step I and then subjecting the resulting mixture to dispersion treatment to obtain an aqueous pigment dispersion solution; and Step III: adding the water-insoluble crosslinking agent to the aqueous pigment dispersion solution obtained in the step II to subject the polymer to crosslinking treatment, thereby obtaining the pigment water dispersion.

(Step I)

The step I is the step of subjecting a mixture containing the polymer A', the water-soluble basic compound and water (hereinafter also referred to merely as a "polymer mixture") to dispersion treatment to obtain a polymer dispersion.

The step I is preferably performed by such a method in which the polymer A' is first mixed with water and then with the water-soluble basic compound and may be further mixed with a surfactant, etc., if required, to obtain the polymer mixture, and thereafter the resulting polymer mixture is subjected to dispersion treatment to obtain a polymer dispersion formed by dispersing the polymer A' in water.

The polymer A' may be previously dissolved in an organic solvent before mixing the polymer A' with water. The organic solvent used above is not particularly limited, and is preferably selected from aliphatic alcohols having not less than 1 and not more than 3 carbon atoms, ketones having not less than 3 and not more than 5 carbon atoms, ethers, esters and the like. Of these organic solvents, from the viewpoints of improving wettability to the pigment, solubility of the polymer A' and adsorption of the polymer A' onto the pigment, more preferred are ketones having not less than 3 and not more than 8 carbon atoms, even more preferred are methyl ethyl ketone and methyl isobutyl ketone, and further even more preferred is methyl ethyl ketone.

In the case where the polymer A' is synthesized by a solution polymerization method, the solvent used in the polymerization method may be directly used as such in the step I.

The neutralization degree of the carboxy groups of the polymer A' in the step I is preferably not less than 10 mol %, more preferably not less than 20 mol %, even more preferably not less than 30 mol % and further even more preferably not less than 40 mol % from the viewpoint of improving redispersibility, water resistance and storage stability of the ink, and is also preferably not more than 100 mol %, more preferably not more than 90 mol %, even more preferably not more than 80 mol %, further even more preferably not more than 70 mol % and still further even more preferably not more than 60 mol % from the viewpoint of improving water resistance of the resulting printed material.

The "neutralization degree" as used herein means the value calculated by dividing a mole equivalent number of the water-soluble basic compound by a mole equivalent number of the carboxy groups of the polymer A', i.e., [(mole equivalent number of water-soluble basic compound)/(mole equivalent number of carboxy groups of polymer A')]. The neutralization degree basically never exceeds 100 mol %. However, since the neutralization degree defined in the present invention is calculated from the mole equivalent number of the water-soluble basic compound, the neutralization degree will exceed 100 mol % if the water-soluble basic compound is used in an excessively large amount.

(Contents of Respective Components in Polymer Dispersion)

The contents of the respective components in the polymer dispersion in the step I are as follows from the viewpoint of improving redispersibility, water resistance and storage stability of the ink as well as from the viewpoint of enhancing productivity of the pigment water dispersion or ink.

The content of the polymer A' in the polymer dispersion is preferably not less than 3.0% by mass, more preferably not less than 5.0% by mass and even more preferably not less than 10% by mass, and is also preferably not more than 20% by mass, more preferably not more than 18% by mass and even more preferably not more than 15% by mass.

The content of the water-soluble basic compound in the polymer dispersion is preferably not less than 0.5% by mass, more preferably not less than 1.0% by mass and even more preferably not less than 2.0% by mass, and is also preferably not more than 10% by mass, more preferably not more than 7.0% by mass and even more preferably not more than 5.0% by mass.

The content of the water-soluble amine compound in the polymer dispersion is preferably not less than 0.5% by mass, more preferably not less than 1.0% by mass and even more preferably not less than 2.0% by mass, and is also preferably not more than 10% by mass, more preferably not more than 7.0% by mass and even more preferably not more than 5.0% by mass.

The content of water in the polymer dispersion is preferably not less than 50% by mass, more preferably not less than 60% by mass and even more preferably not less than 70% by mass, and is also preferably not more than 95% by mass, more preferably not more than 90% by mass and even more preferably not more than 85% by mass.

(Step II)

The step II is the step of subjecting a pigment mixture obtained by adding the pigment to the polymer dispersion obtained in the step I to dispersion treatment to obtain a water dispersion of the polymer A' particles containing the pigment (hereinafter also referred to merely as "pigment-containing polymer A' particles") (such a water dispersion is hereinafter also referred to merely as an "aqueous pigment dispersion solution").

The contents of the respective components in the pigment mixture are as follows from the viewpoint of improving redispersibility, water resistance and storage stability of the ink.

The content of the pigment in the pigment mixture is preferably not less than 5.0% by mass, more preferably not less than 10% by mass and even more preferably not less than 15% by mass, and is also preferably not more than 30% by mass, more preferably not more than 25% by mass and even more preferably not more than 23% by mass.

The content of the polymer A' in the pigment mixture is preferably not less than 1.0% by mass, more preferably not less than 3.0% by mass and even more preferably not less than 5.0% by mass, and is also preferably not more than 15% by mass, more preferably not more than 10% by mass and even more preferably not more than 8.0% by mass.

The content of water in the pigment mixture is preferably not less than 55% by mass, more preferably not less than 60% by mass and even more preferably not less than 65% by mass, and is also preferably not more than 85% by mass, more preferably not more than 80% by mass and even more preferably not more than 75% by mass.

The mass ratio of the pigment to the polymer A' [pigment/polymer A' ] in the pigment mixture is preferably not less than 30/70, more preferably not less than 40/60, even more preferably not less than 50/50 and further even more preferably not less than 60/40, and is also preferably not more than 90/10, more preferably not more than 85/15 and even more preferably not more than 80/20, from the viewpoint of improving redispersibility, water resistance and storage stability of the ink.

(Dispersion Treatment)

The dispersing method for obtaining the aqueous pigment dispersion solution is not particularly limited. The pigment particles may be atomized into fine particles having a desired average particle size only by substantial dispersion treatment by applying a shear stress to the pigment particles. However, it is preferred that the pigment mixture is first subjected to preliminary dispersion treatment, and then further subjected to the substantial dispersion treatment by applying a shear stress to the pigment particles so as to control the average particle size of the resulting pigment particles to a desired value.

The temperature used in the step II, in particular, the temperature used in the preliminary dispersion treatment in the step II, is preferably not lower than 0° C., and is also preferably not higher than 40° C., more preferably not higher than 30° C. and even more preferably not higher than 25° C. The dispersing time is preferably not less than 0.5 hour and more preferably not less than 0.8 hour, and is also preferably not more than 30 hours, more preferably not more than 10 hours and even more preferably not more than 5 hours.

When subjecting the pigment mixture to the preliminary dispersion treatment, there may be used ordinary mixing and stirring devices such as anchor blades and disper blades. Of these devices, preferred are high-speed stirring mixers.

As a means for applying a shear stress to the pigment particles in the substantial dispersion treatment, there may be used, for example, kneading machines such as roll mills and kneaders, high-pressure homogenizers such as "MICROFLUIDIZER" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada iron Works Co., Ltd. These devices may be used in combination of any two or more thereof. Among these devices, the high-pressure homogenizers are preferably used from the viewpoint of reducing a particle size of the pigment.

In the case where the substantial dispersion treatment is conducted using the high-pressure homogenizer, the particle size of the pigment can be adjusted to a desired value by controlling the treating pressure and the number of passes through the homogenizer used in the substantial dispersion treatment.

The treating pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

Also, the number of passes through the homogenizer used in the substantial dispersion treatment is preferably not less than 3 and more preferably not less than 10, and is also preferably not more than 30 and more preferably not more than 25.

The thus-obtained aqueous pigment dispersion solution is in the form of a water dispersion formed by dispersing the pigment-containing polymer A' particles in an aqueous medium containing water as a main medium. The configuration of the pigment-containing polymer A' particles in the aqueous pigment dispersion solution is not particularly limited, and the pigment-containing polymer A' particles may have any configuration as long as the particles are formed of at least the pigment and the polymer A'. Examples of the configuration of the pigment-containing polymer A' particles include the particle configuration in which the pigment is enclosed or encapsulated in the polymer A', the particle configuration in which the pigment is uniformly dispersed in the polymer A', and the particle configuration in which the pigment is exposed onto a surface of the respective polymer A' particles, as well as a mixture of these particle configurations.

The (solid content) of the resulting aqueous pigment dispersion solution is preferably not less than 10% by mass and more preferably not less than 20% by mass, and is also preferably not more than 40% by mass and more preferably not more than 30% by mass from the viewpoint of improving dispersion stability of the pigment water dispersion as well as from the viewpoint of facilitating preparation of the water-based ink. The solid content of the aqueous pigment dispersion solution may be measured by the method described in Examples below.

The average particle size of the pigment-containing polymer A' particles in the aqueous pigment dispersion solution is preferably not less than 40 nm, more preferably not less than 50 nm, even more preferably not less than 60 nm and further even more preferably not less than 70 nm, and is also preferably not more than 200 nm, more preferably not more than 160 nm, even more preferably not more than 150 nm and further even more preferably not more than 130 nm, from the viewpoints of suppressing formation of coarse particles and improving ejection stability of the resulting water-based ink. The average particle size of the pigment-containing polymer A' particles may be measured by the method described in Examples below.

(Step III)

In the step III, from the viewpoint of improving redispersibility, water resistance and storage stability of the ink, the aforementioned water-insoluble crosslinking agent is added to the aqueous pigment dispersion solution obtained in the step II to subject the dispersion solution to crosslinking treatment, thereby obtaining the pigment water dispersion containing the pigment-containing crosslinked polymer A particles. In this step, a part of the carboxy groups contained in the polymer A' constituting the pigment-containing polymer A' particles are subjected to crosslinking reaction with the water-insoluble crosslinking agent to thereby form a crosslinked structure containing a hydrophobic ester group on a surface layer portion of the respective pigment-containing polymer A' particles. As a result, it is possible to obtain the pigment water dispersion in which the pigment is dispersed in the aqueous medium with the crosslinked polymer A.

(Crosslinking Treatment)

The crosslinking reaction between the carboxy groups of the polymer A' and the water-insoluble crosslinking agent is preferably carried out after dispersing the pigment in the aqueous medium with the polymer A'. From the viewpoint of completing the crosslinking reaction and attaining good cost efficiency, the reaction time is preferably not less than 0.5 hour, more preferably not less than 1 hour, even more preferably not less than 1.5 hours and further even more preferably not less than 3 hours, and is also preferably not more than 12 hours, more preferably not more than 10 hours, even more preferably not more than 8 hours and further even more preferably not more than 6 hours.

In addition, from the same viewpoint as described above, the reaction temperature is preferably not lower than 40° C., more preferably not lower than 50° C., even more preferably not lower than 55° C., further even more preferably not lower than 60° C. and still further even more preferably not lower than 65° C., and is also preferably not higher than 90° C. and more preferably not higher than 80° C.

The crosslinking rate of the crosslinked polymer A is preferably not less than 10 mol %, more preferably not less than 20 mol %, even more preferably not less than 30 mol % and further even more preferably not less than 40 mol %, and is also preferably not more than 80 mol %, more preferably not more than 70 mol % and even more preferably not more than 60 mol %. The crosslinking rate of the crosslinked polymer A is an apparent crosslinking rate calculated from an acid value of the polymer A' and an equivalent amount of the epoxy groups of the water-insoluble crosslinking agent, i.e., in the case where a polyfunctional epoxy compound is used as the water-insoluble crosslinking agent, the crosslinking rate of the crosslinked polymer A is defined by [(mole equivalent number of epoxy groups of polyfunctional epoxy compound)/(mole equivalent number of carboxy groups of polymer A')].

The concentration of non-volatile components in the pigment water dispersion (solid content of the pigment water dispersion) is preferably not less than 5% by mass, more preferably not less than 10% by mass and even more preferably not less than 15% by mass, and is also preferably not more than 40% by mass, more preferably not more than 30% by mass and even more preferably not more than 25% by mass, from the viewpoint of improving dispersion stability of the pigment water dispersion as well as from the viewpoint of facilitating preparation of the water-based ink. The solid content of the pigment water dispersion may be measured by the method described in Examples below.

The content of the pigment in the pigment water dispersion is preferably not less than 3.0% by mass, more preferably not less than 5.0% by mass and even more preferably not less than 10% by mass from the viewpoint of enhancing optical density of the water-based ink upon printing, and is also preferably not more than 20% by mass, more preferably not more than 17% by mass and even more preferably not more than 15% by mass from the viewpoint of reducing viscosity of the ink upon evaporation of the solvent therefrom as well as from the viewpoint of improving redispersibility and storage stability of the resulting water-based ink.

The mass ratio of the pigment to the crosslinked polymer A [pigment/crosslinked polymer A] in the pigment water dispersion is preferably not less than 30/70, more preferably not less than 40/60, even more preferably not less than 50/50, further even more preferably not less than 60/40 and still further even more preferably not less than 65/35, and is also preferably not more than 90/10, more preferably not more than 85/15, even more preferably not more than 80/20 and further even more preferably not more than 75/25, from the viewpoint of improving redispersibility, water resistance and storage stability of the ink.

The average particle size of the pigment-containing crosslinked polymer A particles in the pigment water dispersion is preferably not less than 40 nm, more preferably not less than 50 nm, even more preferably not less than 60 nm, further even more preferably not less than 70 nm and still further even more preferably not less than 80 nm, and is also preferably not more than 200 nm, more preferably not more than 160 nm, even more preferably not more than 150 nm and further even more preferably not more than 130 nm, from the viewpoints of suppressing formation of coarse particles and improving storage stability of the resulting water-based ink. The average particle size of the pigment-containing crosslinked polymer A particles may be measured by the method described in Examples below.

The saponification value of the crosslinked polymer A constituting the pigment-containing crosslinked polymer A particles is not less than 170 mgKOH/g, preferably not less than 180 mgKOH/g, more preferably not less than 190 mgKOH/g and even more preferably not less than 200 mgKOH/g, and is also not more than 300 mgKOH/g, preferably not more than 280 mgKOH/g, more preferably not more than 260 mgKOH/g and even more preferably not more than 240 mgKOH/g, from the viewpoint of improving redispersibility, water resistance and storage stability of the ink. When the saponification value of the crosslinked polymer A lies within the aforementioned range, the amounts of the carboxy groups and the neutralized carboxy groups are sufficient to ensure good dispersion stability of the pigment, and it is also possible to form a sufficient quantity of a crosslinked structure in the crosslinked polymer A. The saponification value of the crosslinked polymer A may be measured by the method described in Examples below.

The pigment water dispersion of the present invention may also contain glycerin, propylene glycol, etc., as a humectant for inhibiting drying of the dispersion, in an amount of not less than 1% by mass and not more than 10% by mass. In addition, the pigment water dispersion of the present invention may further contain various other additives that may be usually used in the water-based ink, such as a solvent, a penetrant, a dispersant, a surfactant, a viscosity controller, a defoaming agent, a rust preventive, an antiseptic agent and a mildew-proof agent. The pigment water dispersion of the present invention may also be directly used as water-based inks for flexographic printing, gravure printing or ink-jet printing, preferably as water-based inks for ink-jet printing, and more preferably as water-based inks for ink-jet film printing or water-based inks for ink-jet textile printing.

The aforementioned additives may be compounded in the pigment water dispersion either upon dispersing the pigment with the polymer A', after dispersing the pigment or after conducting the crosslinking treatment.

[Water-Based Ink for Ink-Jet Printing]

The water-based ink for ink-jet printing according to the present invention (hereinafter also referred to merely as a "water-based ink" or an "ink") contains the aforementioned pigment water dispersion and a water-soluble organic solvent from the viewpoint of improving redispersibility, water resistance and storage stability of the ink. The water-soluble organic solvent contains one or more organic solvents each having a boiling point of 90° C. or higher, and the boiling point of the water-soluble organic solvent as a weighted mean value of boiling points of the one or more organic solvents which are weighted by contents (% by mass) of the respective organic solvents is preferably 250° C. or lower.

The water-based ink of the present invention is produced by mixing the aforementioned pigment water dispersion and the aforementioned water-soluble organic solvent. The method of mixing the pigment water dispersion and the water-soluble organic solvent is not particularly limited.

<Water-Soluble Organic Solvent>

The weighted mean value of the boiling point of the water-soluble organic solvent is preferably not lower than 150° C. and more preferably not lower than 180° C., and is also preferably not higher than 240° C., more preferably not higher than 220° C. and even more preferably not higher than 200° C.

The aforementioned water-soluble organic solvent is preferably at least one compound selected from the group consisting of a polyhydric alcohol, a polyhydric alcohol alkyl ether, a nitrogen-containing heterocyclic compound, an amide and a sulfur-containing compound. Among these compounds, from the viewpoint of improving redispersibility, water resistance and storage stability of the ink, more preferred is at least one compound selected from the group consisting of a polyhydric alcohol and a polyhydric alcohol alkyl ether. The polyhydric alcohol may be in the form of a mixed alcohol containing a plurality of compounds belonging to the concept of a polyhydric alcohol, and the polyhydric alcohol alkyl ether may also be in the form of a mixed ether containing a plurality of compounds belonging to the concept of a polyhydric alcohol alkyl ether.

The content of the at least one compound selected from the group consisting of a polyhydric alcohol and a polyhydric alcohol alkyl ether in the aforementioned water-soluble organic solvent is preferably not less than 80% by mass, more preferably not less than 90% by mass, even more preferably not less than 95% by mass, further even more preferably substantially 100% by mass, and still further even more preferably 100% by mass.

Examples of the polyhydric alcohol include ethylene glycol (boiling point (b.p.): 197° C.), diethylene glycol (b.p.: 244° C.), triethylene glycol (b.p.: 285° C.), polyethylene glycol, propylene glycol (b.p.: 188° C.), dipropylene glycol (b.p.: 232° C.), tripropylene glycol (b.p.: 273° C.), trimethylolpropane (b.p.: 149° C.) and glycerin (b.p.: 290° C.). The compound having a boiling point of not lower than 250° C., such as triethylene glycol, tripropylene glycol and glycerin, may be used in combination with a compound having a boiling point lower than 250° C. Among these polyhydric alcohols, from the viewpoint of improving redispersibility, water resistance and storage stability of the ink, preferred are diethylene glycol and propylene glycol.

Examples of the polyhydric alcohol alkyl ether include (poly)alkylene glycol monoalkyl ethers and (poly)alkylene glycol dialkyl ethers. Specific examples of the polyhydric alcohol alkyl ether include ethylene glycol monoethyl ether (b.p.: 135° C.), ethylene glycol monobutyl ether (b.p.: 171° C.), diethylene glycol monomethyl ether (b.p.: 194° C.), diethylene glycol monoethyl ether (b.p.: 202° C.), diethylene glycol monoisopropyl ether (b.p.: 207° C.), diethylene glycol monobutyl ether (b.p.: 230° C.), diethylene glycol monoisobutyl ether, triethylene glycol monomethyl ether (b.p.: 122° C.), triethylene glycol monobutyl ether (b.p.: 276° C.), triethylene glycol monoisobutyl ether (b.p.: 160° C.), tetraethylene glycol monomethyl ether (b.p.: 158° C.), propylene glycol monoethyl ether (b.p.: 133° C.), dipropylene glycol monobutyl ether (b.p.: 227° C.), dipropylene glycol monomethyl ether (b.p.: 90° C.), tripropylene glycol monomethyl ether (b.p.: 100° C.), tripropylene glycol monobutyl ether and diethylene glycol diethyl ether (b.p.: 188° C.). The compound having a boiling point of not lower than 250° C., such as triethylene glycol monobutyl ether, may be used in combination with a compound having a boiling point lower than 250° C. Among these polyhydric alcohol alkyl ethers, from the viewpoint of improving redispersibility, water resistance and storage stability of the ink, preferred is diethylene glycol monoisobutyl ether.

From the viewpoint of improving redispersibility, water resistance and storage stability of the ink, the aforementioned water-soluble organic solvent is preferably at least one compound selected from the group consisting of diethylene glycol, propylene glycol and diethylene glycol monoisobutyl ether, and more preferably at least one compound selected from the group consisting of propylene glycol and diethylene glycol monoisobutyl ether.

[Pigment-Free Water-Insoluble Polymer B Particles]

The water-based ink of the present invention preferably further contains pigment-free water-insoluble polymer B particles (hereinafter also referred to merely as "polymer B particles"). The polymer B particles serve for forming a film of the ink on a printing medium to thereby improve fixing properties of the ink onto the printing medium.

Examples of a water-insoluble polymer B constituting the polymer B particles (hereinafter also referred to merely as a "polymer B") include condensation-based polymers such as polyurethanes and polyesters; and vinyl-based polymers such as acrylic polymers, styrene-based polymers, styrene-acrylic polymers, butadiene-based polymers, styrene-butadiene-based polymers, vinyl chloride-based polymers, vinyl acetate-based polymers and acrylic-silicone-based polymers. Among these polymers, preferred are vinyl-based polymers, and from the viewpoint of promoting drying of the ink on a printing medium and improving rub fastness of the resulting printed materials, more preferred are acrylic polymers.

Meanwhile, the term "water-insoluble" of the water-insoluble polymer B as used herein has the same definition as mentioned previously for the pigment-containing crosslinked polymer A particles.

The polymer B may be either identical to or different from the aforementioned polymer A', and is preferably in the form of a polymer containing a constitutional unit derived from (meth)acrylic acid and a constitutional unit derived from at least one monomer selected from the group consisting of a (meth)acrylate, vinyl chloride and vinyl acetate, and more preferably in the form of a polymer containing a constitutional unit derived from (b-1) (meth)acrylic acid (hereinafter also referred to merely as a "component (b-1)") and a constitutional unit derived from (b-2) a (meth)acrylate (hereinafter also referred to merely as a "component (b-2)").

As the (meth)acrylic acid (b-1), methacrylic acid is preferred.

Examples of the (meth)acrylate (b-2) include the aforementioned aromatic group-containing (meth)acrylates, and the aforementioned (meth)acrylates containing a hydrocarbon group derived from an aliphatic alcohol having not less than 1 and not more than 22 carbon atoms. Of these (meth)acrylates, preferred are (meth)acrylates containing a hydrocarbon group derived from an aliphatic alcohol having not less than 1 and not more than 22 carbon atoms; more preferred is at least one compound selected from the group consisting of methyl (meth)acrylate and 2-ethylhexyl (meth)acrylate; even more preferred is a combination of methyl (meth)acrylate and 2-ethylhexyl (meth)acrylate.

(Production of Water-Insoluble Polymer B Particles)

The polymer B particles may be present in the form of particles that are dispersed in an aqueous medium containing water as a main component. The polymer B particles are preferably used in the form of a water dispersion containing the polymer B particles from the viewpoint of enhancing productivity of the water-based ink.

The water dispersion of the polymer B particles used in the present invention may be either an appropriately synthesized product or a commercially available product.

The water dispersion of the polymer B particles may be produced by copolymerizing a monomer mixture containing the components (b-1) and (b-2) by known polymerization methods. Examples of the preferred polymerization methods include an emulsion polymerization method and a suspension polymerization method, etc. Among these polymerization methods, more preferred is an emulsion polymerization method.

The polymerization may be carried out in the presence of a polymerization initiator. Examples of the polymerization initiator include persulfates and water-soluble azo polymerization initiators. Of these polymerization initiators, more preferred are persulfates such as ammonium persulfate and potassium persulfate.

Upon conducting the polymerization reaction, a surfactant may also be used therein. Examples of the surfactant include a nonionic surfactant, an anionic surfactant, a cationic surfactant and the like. Of these surfactants, from the viewpoint of improving dispersion stability of the polymer particles, preferred is a nonionic surfactant. Examples of the nonionic surfactant include polyoxyethylene alkyl ethers, polyoxyethylene alkyl aryl ethers, polyoxyethylene fatty acid esters, oxyethylene/oxypropylene block copolymers and the like. Of these nonionic surfactants, from the viewpoint of improving dispersion stability of the polymer particles, preferred are polyoxyethylene alkyl ethers.

The preferred polymerization conditions may vary depending upon the kind of polymerization initiator used, etc. The polymerization temperature is preferably not lower than 50° C. and not higher than 90° C., and the polymerization time is preferably not less than 1 hour and not more than 20 hours. In addition, the polymerization is preferably conducted in a nitrogen gas atmosphere or an atmosphere of an inert gas such as argon.

After completion of the polymerization reaction, the polymer B particles thus produced may be isolated from the reaction solution by a known method such as reprecipitation and removal of the solvent by distillation. In addition, the thus obtained polymer B particles may be further subjected to reprecipitation, membrane separation, chromatography, extraction, etc., for removing unreacted monomers, etc., therefrom.

The polymer B particles are preferably used as such in the form of a water dispersion (emulsion) thereof in which the polymer B particles are dispersed in an aqueous medium containing water as a main component, without removing the solvent used in the polymerization reaction therefrom from the viewpoint of well compounding the polymer B particles in the water-based ink as well as from the viewpoint of enhancing productivity of the water-based ink. In addition, the water dispersion may also contain a dispersant such as a surfactant, if required. In addition, the water dispersion of the polymer B particles has a function as a fixing emulsion for fixing droplets of the ink ejected from ink-jet nozzles onto a printing medium to obtain printed characters or images having excellent uniformity.

The concentration of non-volatile components in the water dispersion of the polymer B particles (solid content of the water dispersion) is preferably not less than 30% by mass and more preferably not less than 40% by mass, and is also preferably not more than 60% by mass and more preferably not more than 50% by mass, from the viewpoint of well compounding the polymer B particles in the water-based ink.

(Contents of Respective Components in Monomer Mixture or Contents of Respective Constitutional Units in Water-Insoluble Polymer B)

Upon production of the polymer B, the contents of the aforementioned components (b-1) and (b-2) in the monomer mixture (contents of non-neutralized components; hereinafter defined in the same way) or the contents of the constitutional units derived from the components (b-1) and (b-2), respectively, in the polymer B are as follows, from the viewpoint of improving redispersibility, water resistance and storage stability of the ink.

The content of the component (b-1) is preferably not less than 1.0% by mass, more preferably not less than 1.5% by mass and even more preferably not less than 2.0% by mass, and is also preferably less than 10% by mass, more preferably less than 7.0% by mass and even more preferably less than 5.0% by mass.

The content of the component (b-2) is preferably not less than 90% by mass, more preferably not less than 93% by mass and even more preferably not less than 95% by mass, and is also preferably less than 99% by mass, more preferably less than 98.5% by mass and even more preferably less than 98% by mass.

(Weight-Average Molecular Weight of Water-Insoluble Polymer B)

The weight-average molecular weight of the polymer B is preferably not less than 100,000, more preferably not less than 200,000 and even more preferably not less than 300,000, and is also preferably not more than 2,500,000 and more preferably not more than 1,000,000, from the viewpoint of improving fixing properties of the ink and enhancing an image quality of printed characters or images when printed on a low-water absorbing printing medium. The weight-average molecular weight of the polymer B particles may be measured by the method described in Examples below.

(Average Particle Size of Water-Insoluble Polymer B Particles)

In addition, the average particle size of the polymer B particles in the water dispersion containing the polymer B particles or the water-based ink is preferably not less than 10 nm, more preferably not less than 30 nm, even more preferably not less than 50 nm and further even more preferably not less than 80 nm, and is also preferably not more than 300 nm, more preferably not more than 200 nm, even more preferably not more than 150 nm and further even more preferably not more than 130 nm, from the viewpoint of improving redispersibility, water resistance and storage stability of the ink. The average particle size of the polymer B particles may be measured by the method described in Examples below.

The content of the polymer B particles in the water dispersion of the polymer B particles is preferably not less than 10% by mass, more preferably not less than 20% by mass and even more preferably not less than 30% by mass, and is also preferably not more than 70% by mass, more preferably not more than 60% by mass and even more preferably not more than 50% by mass, from the viewpoint of improving dispersion stability of the water-insoluble polymer B particles in the water dispersion and enhancing convenience upon compounding the polymer B particles in the ink.

Specific examples of commercially available products of the dispersion of the polymer B particles include acrylic resins such as "Neocryl A1127" (anionic self-crosslinkable aqueous acrylic resin) available from DSM NeoResins, Inc., and "JONCRYL 390" available from BASF Japan, Ltd.; urethane resins such as "WBR-2018" and "WBR-2000U" both available from Taisei Fine Chemical Co., Ltd.; styrene-butadiene resins such as "SR-100" and "SR-102" both available from Nippon A & L Inc.; styrene-acrylic resins such as "JONCRYL 7100", "JONCRYL 7600", "JONCRYL 537J", "JONCRYL PDX-7164", "JONCRYL 538J" and "JONCRYL 780" all available from BASF Japan, Ltd.; and vinyl chloride-based resins such as "VINYBLAN 700" and "VINYBLAN 701" both available from Nissin Chemical Co., Ltd., etc.

The water-based ink according to the present invention may further contain various additives that may be usually used in the water-based ink, such as a humectant, a wetting agent, a penetrant, a surfactant, a viscosity controller, a defoaming agent, an antiseptic agent, a mildew-proof agent and a rust preventive, if required. Furthermore, the water-based ink may be subjected to filtration treatment using a filter, etc.

The water-based ink according to the present invention may be loaded into conventionally known ink-jet printing apparatuses, and ejected therefrom in the form of droplets of the ink onto a printing medium to allow the ink to adhere to the printing medium, thereby obtaining a printed material on which characters or images are printed.

The contents of the respective components of the water-based ink according to the present invention as well as properties of the water-based ink are as follows.

The content of the pigment in the water-based ink is preferably not less than 1.0% by mass, more preferably not less than 2.0% by mass and even more preferably not less than 3.0% by mass from the viewpoint of enhancing optical density of the water-based ink upon printing, and is also preferably not more than 10% by mass, more preferably not more than 8.0% by mass and even more preferably not more than 6.0% by mass from the viewpoint of reducing viscosity of the ink upon volatilization of the solvent therefrom as well as from the viewpoint of improving redispersibility and storage stability of the ink.

The total content of the pigment and the crosslinked polymer A in the water-based ink is preferably not less than 2.0% by mass, more preferably not less than 4.0% by mass, even more preferably not less than 5.0% by mass and further even more preferably not less than 6.0% by mass, and is also preferably not more than 15% by mass, more preferably not more than 10% by mass and even more preferably not more than 8.0% by mass.

The mass ratio of the pigment to the crosslinked polymer A [pigment/crosslinked polymer A] in the water-based ink is preferably not less than 30/70, more preferably not less than 40/60, even more preferably not less than 50/50, further even more preferably not less than 60/40 and still further even more preferably not less than 65/35, and is also preferably not more than 90/10, more preferably not more than 85/15, even more preferably not more than 80/20 and further even more preferably not more than 75/25, from the viewpoint of improving redispersibility, water resistance and storage stability of the ink.

The content of the aforementioned water-soluble organic solvent in the water-based ink is preferably not less than 10% by mass, more preferably not less than 15% by mass, even more preferably not less than 20% by mass and further even more preferably not less than 25% by mass, and is also preferably not more than 50% by mass, more preferably not more than 45% by mass, even more preferably not more than 40% by mass and further even more preferably not more than 35% by mass, from the viewpoint of improving redispersibility, water resistance and storage stability of the ink.

The content of water in the water-based ink is preferably not less than 30% by mass, more preferably not less than 40% by mass and even more preferably not less than 50% by mass, and is also preferably not more than 75% by mass, more preferably not more than 70% by mass and even more preferably not more than 65% by mass, from the viewpoint of improving redispersibility, water resistance and storage stability of the ink.

The content of the polymer B particles in the water-based ink is preferably not less than 0.5% by mass, more preferably not less than 1.0% by mass and even more preferably not less than 1.5% by mass, and is also preferably not more than 7.0% by mass, more preferably not more than 5.0% by mass and even more preferably not more than 3.0% by mass, from the viewpoint of improving redispersibility, water resistance and storage stability of the ink.

The mass ratio of the pigment to the polymer B particles [pigment/polymer B particles] in the water-based ink is preferably not less than 30/70, more preferably not less than 40/60, even more preferably not less than 50/50 and further even more preferably not less than 60/40, and is also preferably not more than 90/10, more preferably not more than 85/15, even more preferably not more than 80/20 and further even more preferably not more than 75/25, from the viewpoint of improving redispersibility, water resistance and storage stability of the ink.

(Properties of Water-Based Ink)

The viscosity of the water-based ink as measured at 32° C. is preferably not less than 2.5 mPa·s, more preferably not less than 3.0 mPa·s and even more preferably not less than 3.5 mPa·s, and is also preferably not more than 10 mPa·s, more preferably not more than 7.0 mPa·s and even more preferably not more than 5.0 mPa·s, from the viewpoint of improving storage stability of the ink. The viscosity of the water-based ink may be measured by the method described in Examples below.

The pH value of the water-based ink is preferably not less than 6.0, more preferably not less than 6.5 and even more preferably not less than 7.0 from the viewpoint of improving storage stability of the ink, and is also preferably not more than 11.0, more preferably not more than 10.0 and even more preferably 9.0 from the viewpoint of improving resistance of members to the water-based ink and suppressing skin irritation. The pH value of the water-based ink may be measured by the method described in Examples below.

The pH value of the water-based ink is preferably controlled by further adding a water-soluble basic compound thereto. The water-soluble basic compound is preferably the same as the water-soluble amine compound contained in the aforementioned pigment water dispersion.

In addition, it is preferred that the pigment-containing crosslinked polymer A particles in the water-based ink is free of swelling and contraction of the particles as well as flocculation between the particles. It is more preferred that the average particle size of the pigment-containing crosslinked polymer A particles in the water-based ink is the same as the average particle size of the pigment-containing crosslinked polymer A particles in the aforementioned pigment water dispersion. The preferred range of the average particle size of the pigment-containing crosslinked polymer A particles in the water-based ink is the same as the preferred range of the average particle size of the pigment-containing crosslinked polymer A particles in the aforementioned pigment water dispersion. The average particle size of the pigment-containing crosslinked polymer A particles in the water-based ink may be measured by the method described in Examples below.

[Ink-Jet Printing Method]

The ink-jet printing method of the present invention preferably includes the steps of loading the aforementioned water-based ink into an ink-jet printing apparatus; ejecting the water-based ink from the ink-jet printing apparatus by an ink-jet ejecting method to allow the water-based ink to adhere onto a printing medium; and then drying the printing medium onto which the water-based ink is adhered, at a temperature of not lower than 40° C.

The ink-jet printing apparatus used in the aforementioned method may be either a thermal-type ink-jet printer or a piezoelectric-type ink-jet printer. The water-based ink according to the present invention is preferably used as a water-based ink for ink-jet printing using the piezoelectric-type ink-jet printer.

In the drying step, the drying temperature is preferably not lower than 50° C., more preferably not lower than 60° C., even more preferably not lower than 70° C. and further even more preferably not lower than 80° C. from the viewpoint of improving water resistance of the resulting printed material, and is also preferably not higher than 200° C., more preferably not higher than 150° C. and even more preferably not higher than 120° C. from the viewpoint of suppressing deformation and discoloration of the printing medium owing to heat applied thereto as well as from the viewpoint of saving energy required in the drying step.

Examples of the printing medium include a high-water absorbing plain paper, a low-water absorbing coated paper and a low-water absorbing film.

The ink-jet printing method of the present invention is preferably used in such an ink-jet printing method in which characters or images are printed on a low-water absorbing printing medium, from the viewpoint of well utilizing excellent water resistance of the water-based ink used therein.

The water absorption of the low-water absorbing printing medium used in the present invention as measured by contacting the printing medium with pure water for 100 milliseconds is preferably not less than 0 g/m$^2$, more preferably not less than 1.0 g/m$^2$ and even more preferably not less than 2.0 g/m$^2$ from the viewpoint of improving water resistance of the resulting printed material, and is also preferably not more than 10 g/m$^2$, more preferably not more than 8.0 g/m$^2$, even more preferably not more than 6.0 g/m$^2$ and further even more preferably not more than 4.0 g/m$^2$ from the viewpoint of enhancing optical density and gloss of the printed characters or images. The aforementioned water absorption of the low-water absorbing printing medium may be measured using an automatic scanning absorptometer by the method described in Examples below.

As the low-water absorbing printing medium, from the viewpoint of improving water resistance of the resulting printed material, there may be preferably used a coated paper or a synthetic resin film, and more preferably a synthetic resin film.

Examples of the coated paper include a versatile glossy coated paper, a multi-color foam glossy coated paper, etc. Specific examples of the generally available coated paper include "OK Topcoat Plus" (basis weight: 104.7 g/m$^2$; 60° gloss: 49.0; water absorption as measured in a pure water contact time of 100 milliseconds (hereinafter defined in the same way): 4.9 g/m$^2$) available from Oji Paper Co., Ltd., a multi-color foam glossy coated paper (104.7 g/m$^2$; 60° gloss: 36.8; water absorption: 5.2 g/m$^2$) available from Oji Paper Co., Ltd., "UPM Finesse Gloss" (115 g/m$^2$; 60° gloss: 27.0; water absorption: 3.1 g/m$^2$) available from UPM, "UPM Finesse Matt" (115 g/m$^2$; 600 gloss: 5.6; water absorption: 4.4 g/m$^2$) available from UPM, "TerraPress Silk" (80 g/m$^2$; 60° gloss: 6.0; water absorption: 4.1 g/m$^2$) available from Stora Enso, and "LumiArt" (90 g/m$^2$; 60° gloss: 26.3) available from Stora Enso.

Examples of the synthetic resin film include a polyester film, a polyvinyl chloride film, a polypropylene film, a polyethylene film and a nylon film. These films may be subjected to surface treatments such as corona treatment, etc., if required.

Examples of the generally available synthetic resin films include "LUMIRROR T60" (polyester; 60° gloss: 189.1; water absorption: 2.3 g/m$^2$) available from Toray Industries Inc., "PVC80B P" (polyvinyl chloride; 60° gloss: 58.8; water absorption: 1.4 g/m$^2$) available from Lintec Corporation, "KINATH KEE 70CA" (polyethylene) available from Lintec Corporation, "YUPO SG90 PAT1" (polypropylene) available from Lintec Corporation, "BONYL RX" (nylon) available from Kohjin Film & Chemicals Co., Ltd., and "TETRON U2" (white polyester film) available from Teijin DuPont Films Japan Ltd.

In addition, the ink-jet printing method of the present invention may also be applied to ink-jet textile printing in which synthetic fibers such as low-water absorbing polyester fibers and nylon fibers, etc., or natural fibers are used as a material of the printing medium, because the method is capable of providing a printed material having excellent water resistance.

The fibers that form the printing medium are not particularly limited. Examples of the fibers include vegetable fibers such as cotton and hemp; animal fibers such as silk, wool, alpaca, angora, cashmere and mohair; regenerated fibers such as rayon, cupra and polynosic; semi-synthetic fibers such as acetates, triacetates and promix fibers; synthetic fibers such as nylons, polyesters, acrylic fibers, polyvinyl chloride fibers and polyurethane fibers; and blended fibers constituted of any two or more of these fibers. The aforementioned fibers may be used in the form of any of a woven fabric, a knit fabric and a nonwoven fabric, etc.

With respect to the aforementioned embodiments, the present invention further provides the following aspects relating to the pigment water dispersion and the process for producing the pigment water dispersion, the water-based ink for ink-jet printing which contains the pigment water dispersion, and the ink-jet printing method using the water-based ink.

<1> A pigment water dispersion containing pigment-containing water-insoluble crosslinked polymer A particles, a water-soluble basic compound and water, in which a water-insoluble crosslinked polymer A constituting the particles has a carboxy group and a crosslinked structure containing an ester group derived from a water-insoluble crosslinking agent;

a saponification value of the water-insoluble crosslinked polymer A is not less than 170 mgKOH/g and not more than 300 mgKOH/g; and the water-soluble basic compound contains a water-soluble amine compound.

<2> The pigment water dispersion according to the aspect <1>, wherein the water-insoluble crosslinked polymer A is a polymer obtained by subjecting a carboxy group-containing water-insoluble polymer A' to crosslinking treatment, and the water-insoluble polymer A' is an addition polymer of at least one vinyl monomer selected from the group consisting of a vinyl compound, a vinylidene compound and a vinylene compound.

<3> The pigment water dispersion according to the aspect <2>, wherein the water-insoluble polymer A' contains a constitutional unit derived from (a-1) a carboxy group-containing monomer (component (a-1)) and a constitutional unit derived from (a-2) a hydrophobic monomer (component (a-2)).

<4> The pigment water dispersion according to the aspect <3>, wherein the water-insoluble polymer A' further contains a constitutional unit derived from (a-3) a hydrophilic monomer (component (a-3)).

<5> The pigment water dispersion according to the aspect <3> or <4>, wherein the carboxy group-containing monomer (a-1) is a carboxylic acid monomer.

<6> The pigment water dispersion according to any one of the aspects <3> to <5>, wherein a solubility in water of the hydrophobic monomer (a-2) as measured by dissolving the monomer in 100 g of ion-exchanged water at 25° C. is less than 10 g, preferably not more than 5 g and more preferably not more than 1 g.

<7> The pigment water dispersion according to any one of the aspects <3> to <6>, wherein the hydrophobic monomer (a-2) is at least one monomer selected from the group consisting of an aromatic group-containing monomer, a (meth)acrylate containing a hydrocarbon group derived from an aliphatic alcohol, and an aromatic group-containing monomer-based macromonomer.

<8> The pigment water dispersion according to any one of the aspects <3> to <7>, wherein the hydrophobic monomer (a-2) is preferably at least one monomer selected from the group consisting of a styrene-based monomer, an aromatic group-containing (meth)acrylate and an aromatic group-containing monomer-based macromonomer, more preferably at least one monomer selected from the group consisting of a styrene-based monomer and an aromatic group-containing (meth)acrylate, even more preferably a styrene-based monomer, further even more preferably at least one monomer selected from the group consisting of styrene, 2-methyl styrene and α-methyl styrene, still further even more preferably at least one monomer selected from the group consisting of styrene and α-methyl styrene, and furthermore preferably a combination of styrene and α-methyl styrene.

<9> The pigment water dispersion according to any one of the aspects <4> to <8>, wherein the hydrophilic monomer (a-3) is preferably at least one monomer selected from the group consisting of polyalkylene glycol (meth)acrylates, hydroxyalkyl (meth)acrylates, alkoxy polyalkylene glycol (meth)acrylates and aralkoxy polyalkylene glycols (meth)acrylates; more preferably alkoxy polyalkylene glycol (meth)acrylates and aralkoxy polyalkylene glycol (meth)acrylates; even more preferably at least one monomer selected from the group consisting of polypropylene glycol (n=2 to 30) (meth)acrylate and phenoxy (ethylene glycol/propylene glycol copolymer) (meth)acrylate; and further even more preferably polypropylene glycol (n=2 to 30) (meth)acrylate.

<10> The pigment water dispersion according to any one of the aspects <3> to <9>, wherein a content of the component (a-1) in the water-insoluble polymer A' is preferably not less than 10% by mass, more preferably not less than 15% by mass, even more preferably not less than 18% by mass, further even more preferably not less than 23% by mass and still further even more preferably not less than 26% by mass, and is also preferably not more than 70% by mass, more preferably not more than 60% by mass, even more preferably not more than 50% by mass, further even more preferably not more than 45% by mass, still further even more preferably not more than 35% by mass and furthermore preferably not more than 32% by mass, and a content of the component (a-2) in the water-insoluble polymer A' is preferably not less than 30% by mass, more preferably not less than 40% by mass, even more preferably not less than 50% by mass, further even more preferably not less than 55% by mass, still further even more preferably not less than 65% by mass and furthermore preferably not less than 68% by mass, and is also preferably not more than 90% by mass, more preferably not more than 85% by mass, even more preferably not more than 82% by mass, further even more preferably not more than 77% by mass and still further even more preferably not more than 74% by mass.

<11> The pigment water dispersion according to any one of the aspects <4> to <10>, wherein in the case of further including the component (a-3), a content of the component (a-1) in the polymer A' is preferably not less than 10% by mass, more preferably not less than 15% by mass, even more preferably not less than 20% by mass, further even more preferably not less than 25% by mass and still further even more preferably not less than 26% by mass, and is also preferably not more than 70% by mass, more preferably not more than 60% by mass, even more preferably not more than 50% by mass, further even more preferably not more than 45% by mass, still further even more preferably not more than 35% by mass and furthermore preferably not more than 32% by mass.

<12> The pigment water dispersion according to any one of the aspects <4> to <11>, wherein in the case of further including the component (a-3), a content of the component (a-2) in the water-insoluble polymer A' is preferably not less than 25% by mass, more preferably not less than 30% by mass, even more preferably not less than 35% by mass, further even more preferably not less than 45% by mass and still further even more preferably not less than 50% by mass, and is also preferably not more than 85% by mass, more preferably not more than 78% by mass and even more preferably not more than 75% by mass.

<13> The pigment water dispersion according to any one of the aspects <4> to <12>, wherein in the case of further including the component (a-3), a content of the component (a-3) in the water-insoluble polymer A' is preferably not more than 30% by mass, more preferably not more than 25% by mass, even more preferably not more than 20% by mass, further even more preferably not more than 15% by mass, still further even more preferably not more than 10% by mass and furthermore preferably not more than 5.0% by mass.

<14> The pigment water dispersion according to any one of the aspects <3> to <13>, wherein a mass ratio of the component (a-1) to the component (a-2) [component (a-1)/component (a-2)] is preferably not less than 0.05, more preferably not less than 0.15, even more preferably not less than 0.25 and further even more preferably not less than 0.30, and is also preferably not more than 1.2, more preferably not more than 0.80, even more preferably not more than 0.60 and further even more preferably not more than 0.50.

<15> The pigment water dispersion according to any one of the aspects <4> to <14>, wherein in the case of further including the component (a-3), a mass ratio of the component (a-3) to a sum of the component (a-1) and the component (a-2) [component (a-3)/[component (a-1)+component (a-2)]] is preferably not more than 0.4, more preferably not more than 0.25 and even more preferably not more than 0.10.

<16> The pigment water dispersion according to any one of the aspects <2> to <15>, wherein a weight-average molecular weight of the water-insoluble polymer A' is preferably not less than 3,000, more preferably not less than 6,000 and even more preferably not less than 10,000, and is also preferably not more than 100,000, more preferably not more than 80,000, even more preferably not more than 50,000, further even more preferably not more than 30,000 and still further even more preferably not more than 20,000.

<17> The pigment water dispersion according to any one of the aspects <2> to <16>, wherein a number-average molecular weight of the water-insoluble polymer A' is preferably not less than 2,000, more preferably not less than 3,000 and even more preferably not less than 4,000, and is also preferably not more than 20,000, more preferably not more than 15,000, even more preferably not more than 10,000 and further even more preferably not more than 6,000.

<18> The pigment water dispersion according to any one of the aspects <1> to <17>, wherein a content of the water-soluble amine compound in the water-soluble basic compound is preferably not less than 50 mol %, more preferably not less than 70 mol %, even more preferably not less than 80 mol %, further even more preferably not less than 90 mol %, still further even more preferably not less than 95 mol %, furthermore preferably not less than 98 mol %, even furthermore preferably substantially 100 mol %, and still even furthermore preferably 100 mol %.

<19> The pigment water dispersion according to any one of the aspects <1> to <18>, wherein the number of carbon atoms in the water-soluble amine compound is preferably not less than 2 and more preferably not less than 3, and is also preferably not more than 8 and more preferably not more than 6.

<20> The pigment water dispersion according to any one of the aspects <1> to <19>, wherein a boiling point of the water-soluble amine compound is preferably not lower than 85° C., more preferably not lower than 100° C., even more preferably not lower than 150° C., further even more preferably not lower than 180° C. and still further even more preferably not lower than 200° C., and is also preferably not higher than 350° C., more preferably not higher than 300° C. and even more preferably not higher than 280° C.

<21> The pigment water dispersion according to any one of the aspects <1> to <20>, wherein the water-soluble amine compound is preferably an alkanolamine having not less than 2 and not more than 8 carbon atoms, more preferably a tertiary alkanolamine, and even more preferably a tertiary ethanolamine.

<22> The pigment water dispersion according to any one of the aspects <1> to <21>, wherein the water-soluble amine compound is preferably at least one compound selected from the group consisting of N-methyl diethanolamine (boiling point (b.p.): 247° C.), N,N-dimethyl ethanolamine (b.p.: 135° C.), diethanolamine (b.p.: 269° C.) and triethanolamine (b.p.: 335° C.), more preferably at least one compound selected from the group consisting of N methyl diethanolamine, N,N-dimethyl ethanolamine and triethanolamine, and even more preferably N methyl diethanolamine.

<23> The pigment water dispersion according to any one of the aspects <1> to <22>, wherein a water solubility rate of the water-insoluble crosslinking agent is preferably not more than 50% by mass, more preferably not more than 40% by mass and even more preferably not more than 35% by mass.

<24> The pigment water dispersion according to any one of the aspects <1> to <23>, wherein the water-insoluble crosslinking agent is a polyfunctional epoxy compound.

<25> The pigment water dispersion according to the aspect <24>, wherein the number of epoxy groups contained per one molecule of the polyfunctional epoxy compound is not less than 2, and is also preferably not more than 6, more preferably not more than 4 and even more preferably not more than 3.

<26> The pigment water dispersion according to the aspect <24> or <25>, wherein the polyfunctional epoxy compound is preferably a compound containing not less than 2 glycidyl ether groups, more preferably a compound containing not less than 2 glycidyl ether groups derived from a polyhydric alcohol containing a hydrocarbon group having not less than 3 and not more than 8 carbon atoms, even more preferably a compound containing not less than 2 and not more than 3 glycidyl ether groups derived from a polyhydric alcohol containing a hydrocarbon group having not less than 3 and not more than 8 carbon atoms, and further even more preferably a compound containing not less than 2 and not more than 3 glycidyl ether groups derived from a polyhydric alcohol containing a hydrocarbon group having not less than 3 and not more than 6 carbon atoms.

<27> The pigment water dispersion according to any one of the aspects <24> to <26>, wherein a molecular weight of the polyfunctional epoxy compound is preferably not less than 120, more preferably not less than 150 and even more preferably not less than 200, and is also preferably not more than 2,000, more preferably not more than 1,500, even more preferably not more than 1,000 and further even more preferably not more than 500.

<28> The pigment water dispersion according to any one of the aspects <24> to <27>, wherein the polyfunctional epoxy compound is preferably at least one compound selected from the group consisting of trimethylolpropane polyglycidyl ether (water solubility rate: 27% by mass), 1,6-hexanediol diglycidyl ether (water solubility rate: 0% by mass) and pentaerythritol polyglycidyl ether (water solubility rate: 0% by mass), more preferably at least one compound selected from the group consisting of trimethylolpropane polyglycidyl ether and 1,6-hexanediol diglycidyl ether, and even more preferably trimethylolpropane polyglycidyl ether.

<29> The pigment water dispersion according to any one of the aspects <1> to <28>, wherein a crosslinking rate of the crosslinked polymer A is preferably not less than 10 mol %, more preferably not less than 20 mol %, even more preferably not less than 30 mol % and further even more preferably not less than 40 mol %, and is also preferably not more than 80 mol %, more preferably not more than 70 mol % and even more preferably not more than 60 mol %.

<30> The pigment water dispersion according to any one of the aspects <1> to <29>, wherein a content of the pigment in the pigment water dispersion is preferably not less than 3.0% by mass, more preferably not less than 5.0% by mass and even more preferably not less than 10% by mass, and is also preferably not more than 20% by mass, more preferably not more than 17% by mass and even more preferably not more than 15% by mass.

<31> The pigment water dispersion according to any one of the aspects <1> to <30>, wherein a mass ratio of the pigment to the crosslinked polymer A [pigment/crosslinked polymer A] in the pigment water dispersion is preferably not less than 30/70, more preferably not less than 40/60, even more preferably not less than 50/50, further even more preferably not less than 60/40 and still further even more preferably not less than 65/35, and is also preferably not more than 90/10, more preferably not more than 85/15, even more preferably not more than 80/20 and further even more preferably not more than 75/25.

<32> The pigment water dispersion according to any one of the aspects <1> to <31>, wherein an average particle size of the pigment-containing crosslinked polymer A particles in the pigment water dispersion is preferably not less than nm, more preferably not less than 50 nm, even more preferably not less than 60 nm, further even more preferably not less than 70 nm and still further even more preferably not less than 80 nm, and is also preferably not more than 200 nm, more preferably not more than 160 nm, even more preferably not more than 150 nm and further even more preferably not more than 130 nm.

<33> The pigment water dispersion according to any one of the aspects <1> to <32>, wherein a saponification value of the crosslinked polymer A constituting the pigment-containing crosslinked polymer A particles is preferably not less than 180 mgKOH/g, more preferably not less than 190 mgKOH/g and even more preferably not less than 200 mgKOH/g, and is also preferably not more than 280 mgKOH/g, more preferably not more than 260 mgKOH/g and even more preferably not more than 240 mgKOH/g.

<34> A process for producing a pigment water dispersion containing pigment-containing water-insoluble crosslinked polymer A particles, a water-soluble basic compound and water, said process including:

Step I: subjecting a mixture containing a carboxy group-containing water-insoluble polymer A', a water-soluble basic compound and water to dispersion treatment to obtain a polymer dispersion;

Step II: adding a pigment to the polymer dispersion obtained in the step I and then subjecting the resulting mixture to dispersion treatment to obtain an aqueous pigment dispersion solution; and Step III: adding a water-insoluble crosslinking agent to the aqueous pigment dispersion solution obtained in the step II to subject the polymer to crosslinking treatment, thereby obtaining the pigment water dispersion, in which a saponification value of the water-insoluble crosslinked polymer A constituting the particles is not less than 170 mgKOH/g and not more than 300 mgKOH/g; and the water-soluble basic compound contained in the pigment water dispersion contains a water-soluble amine compound.

<35> The process for producing a pigment water dispersion according to the aspect <34>, wherein a neutralization degree of the carboxy groups of the polymer A' in the step I is preferably not less than 10 mol %, more preferably not less than 20 mol %, even more preferably not less than 30 mol % and further even more preferably not less than 40 mol %, and is also preferably not more than 100 mol %, more preferably not more than 90 mol %, even more preferably not more than 80 mol %, further even more preferably not more than 70 mol % and still further even more preferably not more than 60 mol %.

<36> The process for producing a pigment water dispersion according to the aspect <34> or <35>, wherein the water-insoluble polymer A' contains a constitutional unit derived from (a-1) a carboxy group-containing monomer and a constitutional unit derived from (a-2) a hydrophobic monomer.

<37> The process for producing a pigment water dispersion according to the aspect <36>, wherein the carboxy group-containing monomer (a-1) is a carboxylic acid monomer.

<38> The process for producing a pigment water dispersion according to the aspect <36> or <37>, wherein a solubility in water of the hydrophobic monomer (a-2) as measured by dissolving the monomer in 100 g of ion-exchanged water at 25° C. is less than 10 g, preferably not more than 5 g and more preferably not more than 1 g.

<39> The process for producing a pigment water dispersion according to any one of the aspects <36> to <38>, wherein the hydrophobic monomer (a-2) is at least one monomer selected from the group consisting of an aromatic group-containing monomer, a (meth)acrylate containing a hydrocarbon group derived from an aliphatic alcohol, and an aromatic group-containing monomer-based macromonomer.

<40> The process for producing a pigment water dispersion according to any one of the aspects <36> to <39>, wherein the hydrophobic monomer (a-2) is preferably at least one monomer selected from the group consisting of a styrene-based monomer, an aromatic group-containing (meth)acrylate and an aromatic group-containing monomer-based macromonomer, more preferably at least one monomer selected from the group consisting of a styrene-based monomer and an aromatic group-containing (meth)acrylate, even more preferably a styrene-based monomer, further even more preferably at least one monomer selected from the group consisting of styrene, 2-methyl styrene and α-methyl styrene, still further even more preferably at least one monomer selected from the group consisting of styrene and α-methyl styrene, and furthermore preferably a combination of styrene and α-methyl styrene.

<41> A water-based ink for ink-jet printing containing the pigment water dispersion according to any one of the aspects <1> to <33>, and a water-soluble organic solvent, in which the water-soluble organic solvent contains one or more organic solvents each having a boiling point of not lower than 90° C., and a boiling point of the water-soluble organic solvent as a weighted mean value of boiling points of the one or more organic solvents which are weighted by contents (% by mass) of the respective organic solvents is not higher than 250° C.

<42> The water-based ink for ink-jet printing according to the aspect <41>, wherein the weighted mean value of the boiling point of the water-soluble organic solvent is preferably not lower than 150° C. and more preferably not lower than 180° C., and is also preferably not higher than 240° C., more preferably not higher than 220° C. and even more preferably not higher than 200° C.

<43> The water-based ink for ink-jet printing according to the aspect <41> or <42>, wherein the water-soluble organic solvent is preferably at least one compound selected from the group consisting of a polyhydric alcohol, a polyhydric alcohol alkyl ether, a nitrogen-containing heterocyclic compound, an amide and a sulfur-containing compound, and more preferably at least one compound selected from the group consisting of a polyhydric alcohol and a polyhydric alcohol alkyl ether.

<44> The water-based ink for ink-jet printing according to any one of the aspects <41> to <43>, wherein a content of the at least one compound selected from the group consisting of a polyhydric alcohol and a polyhydric alcohol alkyl ether in the water-soluble organic solvent is preferably not less than 80% by mass, more preferably not less than 90% by mass, even more preferably not less than 95% by mass, further even more preferably substantially 100% by mass, and still further even more preferably 100% by mass.

<45> The water-based ink for ink-jet printing according to any one of the aspects <41> to <44>, further containing pigment-free water-insoluble polymer B particles.

<46> The water-based ink for ink-jet printing according to the aspect <45>, wherein the polymer B particles are preferably vinyl-based polymer particles, and a water-insoluble polymer B constituting the polymer B particles is more preferably an acrylic polymer.

<47> The water-based ink for ink-jet printing according to the aspect <45> or <46>, wherein a weight-average molecular weight of the polymer B is preferably not less than 100,000, more preferably not less than 200,000 and even more preferably not less than 300,000, and is also preferably not more than 2,500,000 and more preferably not more than 1,000,000.

<48> The water-based ink for ink-jet printing according to any one of the aspects <45> to <47>, wherein an average particle size of the polymer B particles is preferably not less than 10 nm, more preferably not less than 30 nm, even more preferably not less than 50 nm and further even more preferably not less than 80 nm, and is also preferably not more than 300 nm, more preferably not more than 200 nm, even more preferably not more than 150 nm and further even more preferably not more than 130 nm.

<49> An ink-jet printing method including the steps of:
  ejecting the water-based ink for ink-jet printing according to any one of the aspects <41> to <48> by an ink-jet ejecting method to allow the water-based ink to adhere onto a printing medium; and
  then drying the printing medium onto which the water-based ink is adhered, at a temperature of not lower than 40° C.

<50> The ink-jet printing method according to the aspect <49>, wherein in the drying step, a drying temperature is preferably not lower than 50° C., more preferably not lower than 60° C., even more preferably not lower than 70° C. and further even more preferably not lower than 80° C., and is also preferably not higher than 200° C., more preferably not higher than 150° C. and even more preferably not higher than 120° C.

<51> The ink-jet printing method according to the aspect <49> or <50>, wherein the printing medium is a low-water absorbing printing medium, and a water absorption of the low-water absorbing printing medium as measured by contacting the printing medium with pure water for 100 milliseconds is preferably not less than 0 g/m², more preferably not less than 1.0 g/m² and even more preferably not less than 2.0 g/m², and is also preferably not more than 10 g/m², more preferably not more than 8.0 g/m², even more preferably not more than 6.0 g/m² and further even more preferably not more than 4.0 g/m².

<52> A use of the pigment water dispersion according to any one of the aspects <1> to <33> for a water-based ink for ink-jet textile printing.

<53> A use of the water-based ink for ink-jet printing according to any one of the aspects <41> to <48> in an ink-jet printing method.

EXAMPLES

In the following Production Examples, Examples and Comparative Examples, etc., the "part(s)" and "%" indicate "part(s) by mass" and "% by mass", respectively, unless otherwise specified.

(1) Measurement of Weight-Average Molecular Weight and Number-Average Molecular Weight of Water-Insoluble Polymer The weight-average molecular weight and number-average molecular weight of the water-insoluble polymer were measured by gel chromatographic method [GPC apparatus: "HLC-8320GPC" available from Tosoh Corporation; columns: "TSK-gel Super AWM-H", "TSK-gel Super AW3000" and "guardcolumn Super AW-H" all available from Tosoh Corporation; flow rate: 0.5 mL/min] using a solution prepared by dissolving phosphoric acid and lithium bromide in N,N-dimethyl formamide such that concentrations of the phosphoric acid and lithium bromide were 60 mmol/L and 50 mmol/L, respectively, as an eluent, and using kits of monodisperse polystyrenes having known molecular weights [PStQuick B ("F-550", "F-80", "F-10", "F-1" and "A-1000"); PStQuick A ("F-228", "F-40", "F-4", "A-5000" and "A-500") both available from Tosoh Corporation] as reference standard substances.

(2) Measurement of Average Particle Sizes of Pigment-Containing Polymer A' Particles, Pigment-Containing Crosslinked Polymer a Particles and Polymer B Particles The particles were subjected to cumulant analysis using a laser particle analyzing system "ELS-8000" available from Otsuka Electrics Co., Ltd., to measure a cumulant average particle size thereof. The measurement was conducted under the conditions including a temperature of 25° C., an angle between incident light and detector of 90° and a cumulative number of 100 times, and a refractive index of water (1.333) was input to the analyzing system as a refractive index of the dispersing medium. Further, the measurement was conducted by adjusting a concentration of the dispersion to be measured to $5 \times 10^3$% by mass in terms of a solid content thereof.

(3) Measurement of Solid Contents of Aqueous Pigment Dispersion Solution, Pigment Water Dispersion and Water Dispersion of Polymer B Particles Sodium sulfate dried to constant weight in a desiccator was weighed in an amount of 10.0 g and charged in a 30 mL polypropylene container (ϕ: 40 mm; height: 30 mm), and about 1.0 g of a sample to be measured was added to the polypropylene container. The contents of the polypropylene container were mixed and then accurately weighed. The resulting mixture was maintained in the polypropylene container under the environmental conditions including a temperature of 105° C. and a gauge pressure of 0.08 MPa for 2 hours to remove volatile components therefrom, and further allowed to stand in a desiccator at room temperature (25° C.) for 15 minutes to then measure a mass thereof. The mass of the sample thus measured after removing the volatile components therefrom was regarded as a mass of solid components therein. The solid content of the sample was calculated by dividing the mass of the solid components by the mass of the sample initially charged.

(4) Measurement of Water Solubility Rate of Crosslinking Agent

A glass tube (25 mmϕ in diameter×250 mm in height) was charged with 90 parts by mass of ion-exchanged water and 10 parts by mass (W1) of a crosslinking agent at room temperature (25° C.). The glass tube thus charged was allowed to stand for 1 hour in a thermostatic bath controlled to a water temperature of 25° C. Next, the contents of the glass tube were vigorously shaken for 1 minute, and the glass tube was placed again in the thermostatic bath, followed by allowing the glass tube to stand in the bath for 12 hours. Then, undissolved components that were separated from water and precipitated or floated in the dispersion within the glass tube were recovered and then dried under the environmental conditions including a temperature of 40° C. and a gauge pressure of 0.08 MPa for 6 hours, and the mass (W2) of the resulting dried product was measured to calculate a water solubility rate (% by mass) of the crosslinking agent according to the following formula.

$$\text{Water Solubility Rate(\% by mass)} = \{(W1-W2)/W1\} \times 100$$

(5) Viscosity of Ink

The viscosity of the ink was measured at 32° C. using an E-type viscometer "TV-25" (using a standard cone rotor 1° 34'×R24; rotating speed: 50 rpm) available from Toki Sangyo Co., Ltd.

(6) pH of Ink

The pH value of the ink was measured at 25° C. using a bench-top pH meter "F-71" available from Horiba Ltd., equipped with a pH electrode "6337-10D" available from Horiba Ltd.

(7) Water Absorption of Printing Medium

The water absorption of the printing medium as measured by contacting the printing medium with pure water for 100 milliseconds was determined as follows. That is, using an automatic scanning absorptometer "KM500win" available from Kumagai Riki Kogyo Co., Ltd., an amount of pure water transferred to the printing medium when allowing the printing medium to contact with pure water at 23° C. under a relative humidity of 50% RH for 100 milliseconds was measured. The thus measured amount of pure water transferred to the printing medium was determined as the water absorption of the printing medium. The measuring conditions are as follows.

"Spiral Method"
    Contact time: 0.010 to 1.0 (sec)
    Pitch (mm): 7
    Length Per Sampling (degree): 86.29
    Start Radius (mm): 20
    End Radius (mm): 60
    Min Contact Time (ms): 10
    Max Contact Time (ms): 1000
    Sampling Pattern (1-50): 50
    Number of Sampling Points (>0): 19
"Square Head"
    Split Span (mm): 1
    Split Width (mm): 5

PRODUCTION OF WATER-INSOLUBLE POLYMER

Production Example 1

Sixty two (62) parts of acrylic acid (reagent) available from Wako Pure Chemical Industries, Ltd., 129 parts of styrene (reagent) available from Wako Pure Chemical Industries, Ltd., and 9 parts of α-methyl styrene (reagent) available from Wako Pure Chemical Industries, Ltd., were mixed to prepare a monomer mixture solution.

Twenty (20) parts of methyl ethyl ketone and 0.3 part of 2-mercaptoethanol as a chain transfer agent as well as 10% of the monomer mixture solution prepared above were charged into a reaction vessel and mixed with each other, and then an inside atmosphere of the reaction vessel was fully replaced with nitrogen gas.

Separately, a mixed solution prepared by mixing remaining 90% of the monomer mixture solution, 0.27 part of the aforementioned chain transfer agent, 60 parts of methyl ethyl ketone and 2.2 parts of an azo-based radical polymerization initiator "V-65" (tradename; 2,2'-azobis(2,4-dimethylvaleronitrile)) available from Wako Pure Chemical Industries, Ltd., was charged into a dropping funnel. In a nitrogen atmosphere, the monomer mixture solution in the reaction vessel was heated to 65° C. while stirring, and then the mixed solution in the dropping funnel was added dropwise thereinto over 3 hours. After the elapse of 1 hour from completion of the dropwise addition while maintaining the resulting mixed solution at 65° C., a solution prepared by dissolving 0.3 part of the aforementioned polymerization initiator in 5 parts of methyl ethyl ketone was added to the mixed solution, and the resulting reaction solution was further aged at 65° C. for 1 hour. The aforementioned procedure including the preparation and addition of the polymerization initiator solution and the aging of the reaction solution was repeated two more times. Thereafter, the obtained reaction solution in the reaction vessel was heated to 70° C. and maintained at 70° C. for 1 hour, and then 200 parts of methyl ethyl ketone were added thereto, thereby obtaining a solution of a polymer A'1 (weight-average molecular weight: 12,500; number-average molecular weight: 5,700) (solid content: 40.9%).

Production Example 2

The same polymerization procedure as in Production Example 1 was repeated except that 62 parts of acrylic acid, 129 parts of styrene and 9 parts of α-methyl styrene were respectively replaced with 50 parts of acrylic acid, 150 parts of styrene and 0 part of α-methyl styrene, thereby obtaining a solution of a polymer A'2 (weight-average molecular weight: 12,000; number-average molecular weight: 4,200).

Production Example 3

The monomers, solvent (methyl ethyl ketone) and chain transfer agent (2-mercaptoethanol) shown in the column "Initially Charged Monomer Solution" of Table 1 were charged into a reaction vessel equipped with two dropping funnels 1 and 2 and mixed with each other, and an inside atmosphere of the reaction vessel was replaced with nitrogen gas, thereby obtaining an initially charged monomer solution.

On the other hand, the monomers, solvent, polymerization initiator "V-65" (tradename; 2,2'-azobis(2,4-dimethylvaleronitrile)) available from Wako Pure Chemical Industries, Ltd., and chain transfer agent as shown in the column "Dropping Monomer Solution 1" of Table 1 were mixed with each other to obtain a dropping monomer solution 1. The resulting dropping monomer solution 1 was charged into the dropping funnel 1, and an inside atmosphere of the dropping funnel 1 was replaced with nitrogen gas.

In addition, the monomers, solvent, polymerization initiator and chain transfer agent as shown in the column "Dropping Monomer Solution 2" of Table 1 were mixed with each other to obtain a dropping monomer solution 2. The resulting dropping monomer solution 2 was charged into the dropping funnel 2, and an inside atmosphere of the dropping funnel 2 was replaced with nitrogen gas.

In a nitrogen atmosphere, the initially charged monomer solution in the reaction vessel was maintained at 77° C. while stirring, and the dropping monomer solution 1 in the dropping funnel 1 was gradually added dropwise to the reaction vessel over 3 hours. Next, the dropping monomer solution 2 in the dropping funnel 2 was gradually added dropwise to the reaction vessel over 2 hours. After completion of the dropwise addition, the mixed solution in the reaction vessel was stirred at 77° C. for 0.5 hour.

Then, a polymerization initiator solution prepared by dissolving 0.4 part of the aforementioned polymerization initiator "V-65" in 20 parts of methyl ethyl ketone was added to the mixed solution, and the resulting reaction solution was aged at 77° C. for 1 hour while stirring. The aforementioned procedure including the preparation and addition of the polymerization initiator solution and the aging of the reaction solution was repeated five more times. Then, after maintaining the reaction solution in the reaction vessel at 80° C. for 1 hour, 400 parts of methyl ethyl ketone were added thereto, thereby obtaining a solution of a polymer A'3 (weight-average molecular weight: 52,700; number-average molecular weight: 9,600) (solid content: 40.8%).

Production Example 4

The same polymerization procedure as in Production Example 1 was repeated except that 62 parts of acrylic acid, 129 parts of styrene and 9 parts of α-methyl styrene were respectively replaced with 40 parts of acrylic acid, 160 parts of styrene and 0 part of α-methyl styrene, thereby obtaining a solution of a polymer A'4 (weight-average molecular weight: 13,300; number-average molecular weight: 4,300).

<Production of Water Dispersion of Pigment-Free Water-Insoluble Polymer B Particles>

Production Example 5

A 1000 mL-capacity separable flask was charged with 5 parts of methacrylic acid available from Wako Pure Chemical Industries, Ltd., 145 parts of methyl methacrylate available from Wako Pure Chemical Industries, Ltd., 50 parts of 2-ethylhexyl acrylate available from Wako Pure Chemical Industries, Ltd., 18.5 parts (in terms of active ingredients) of a sodium polyoxyethylene (18) laurylethersulfate aqueous solution "LATEMUL E118B" (tradename; active ingredient concentration: 26%) available from Kao Corporation, 96 parts of ion-exchanged water and 0.4 part of potassium persulfate available from Wako Pure Chemical Industries, Ltd., and the contents of the flask were stirred using an agitation blade (300 rpm), thereby obtaining a monomer emulsion.

A reaction vessel was charged with 5% of the aforementioned monomer emulsion, 4.6 parts (in terms of active ingredients) of "LATEMUL E118B", 186 parts of ion-exchanged water and 0.08 part of potassium persulfate, and an inside atmosphere of the reaction vessel was fully replaced with nitrogen gas. In a nitrogen atmosphere, the contents of the reaction vessel were heated to 80° C. while stirring with an agitation blade (200 rpm), and then remaining 95% of the aforementioned monomer emulsion was charged into a dropping funnel and added dropwise into the reaction vessel over 3 hours to subject the monomer emulsion to polymerization reaction, thereby obtaining a water dispersion of particles of a polymer B1 (weight-average molecular weight: 500,000) (solid content: 41%). The average particle size of the polymer B1 particles was 115 nm.

Meanwhile, the details of the monomers shown in Table 1 were as follows. Also, the amounts of the respective components compounded as shown in Table 1 represent the amounts compounded in terms of active ingredients of the respective components.

Styrene macromer: "AS-6S" (active ingredient concentration: 50%; number-average molecular weight: 6,000; end group: methacryloyl group; segment: styrene) available from Toagosei Co., Ltd.

M-40G: Methoxy polyethylene glycol monomethacrylate "NK ESTER M-40G" (average molar number of addition of ethyleneoxide: 4; end group: methoxy group) available from Shin-Nakamura Chemical Co., Ltd.

E-118B: Sodium polyoxyethylene (18) laurylethersulfate aqueous solution

TABLE 1

| | | Production Example 1 | | Production Example 2 | | Production Example 3 | | |
|---|---|---|---|---|---|---|---|---|
| | | Initially charged monomer solution (part(s)) | Dropping monomer solution 1 (part(s)) | Initially charged monomer solution (part(s)) | Dropping monomer solution 1 (part(s)) | Initially charged monomer solution (part(s)) | Dropping monomer solution 1 (part(s)) | Dropping monomer solution 2 (part(s)) |
| Carboxy group-containing monomer | Acrylic acid | 6.2 | 55.8 | 5.0 | 45.0 | | | |
| | Methacrylic acid | | | | | | 57.6 | 14.4 |
| Hydrophobic monomer | Styrene | 12.9 | 116.1 | 15.0 | 135.0 | 19.8 | 158.4 | 19.8 |
| | α-Methyl styrene | 0.9 | 8.1 | | | | | |
| | Methyl methacrylate | | | | | | | |
| | 2-Ethylhexyl acrylate | | | | | | | |
| | Styrene macromer | | | | | 13.5 | 54.0 | |
| Hydrophilic monomer | "M-40G" | | | | | 11.3 | 90.0 | 11.3 |
| Solvent | Methyl ethyl ketone | 20.0 | 60.0 | 20.0 | 60.0 | 7.9 | 86.6 | 63.0 |
| | Ion-exchanged water | | | | | | | |
| Polymerization initiator | "V-65" | | 2.2 | | 2.2 | | 3.6 | 0.9 |
| | Potassium persulfate | | | | | | | |
| Chain transfer agent | 2-Mercaptoethanol | 0.30 | 0.27 | 0.30 | 0.27 | 0.06 | 0.44 | 0.13 |
| Surfactant (for emulsion polymerization) | "E-118B" | | | | | | | |

| | | Production Example 4 | | Production Example 5 | |
|---|---|---|---|---|---|
| | | Initially charged monomer solution (part(s)) | Dropping monomer solution 1 (part(s)) | Initially charged monomer solution (part(s)) | Dropping monomer solution 1 (part(s)) |
| Carboxy group-containing monomer | Acrylic acid | 4.0 | 36.0 | | |
| | Methacrylic acid | | | 0.3 | 4.7 |
| Hydrophobic monomer | Styrene | 16.0 | 144.0 | | |
| | α-Methyl styrene | | | | |
| | Methyl methacrylate | | | 7.3 | 137.7 |
| | 2-Ethylhexyl acrylate | | | 2.5 | 47.5 |
| | Styrene macromer | | | | |
| Hydrophilic monomer | "M-40G" | | | | |
| Solvent | Methyl ethyl ketone | 20.0 | 60.0 | | |
| | Ion-exchanged water | | | 190.8 | 91.2 |

TABLE 1-continued

| Polymerization initiator | "V-65" | | 2.2 | | |
|---|---|---|---|---|---|
| | Potassium persulfate | | | 0.10 | 0.38 |
| Chain transfer agent | 2-Mercaptoethanol | 0.30 | 0.27 | | |
| Surfactant (for emulsion polymerization) | "E-118B" | | | 5.5 | 17.6 |

TABLE 2

| | | Composition (%) and molecular weight of water-insoluble polymer produced | | | | |
|---|---|---|---|---|---|---|
| Kind of water-insoluble polymer | | A'1 | A'2 | A'3 | A'4 | B1(*1) |
| Carboxy group-containing monomer | Acrylic acid | 31.0 | 25.0 | | 20.0 | |
| | Methacrylic acid | | | 16.0 | | 2.5 |
| Hydrophobic monomer | Styrene | 64.5 | 75.0 | 44.0 | 80.0 | |
| | α-Methyl styrene | 4.5 | | | | |
| | Methyl methacrylate | | | | | 72.5 |
| | 2-Ethylhexyl acrylate | | | | | 25.0 |
| | Styrene macromer | | | 15.0 | | |
| Hydrophilic monomer | "M-40G" | | | 25.0 | | |
| Weight-average molecular weight | | 12,500 | 12,000 | 52,700 | 13,300 | 500,000 |
| Number-average molecular weight | | 5,700 | 4,200 | 9,600 | 4,300 | — |

Note:
(*1)Pigment-free water-insoluble polymer B particles

Measurement of Saponification Value of
Water-Insoluble Crosslinked Polymer A

In order to accurately measure a saponification value of the crosslinked polymer A, a dispersion of the pigment-free water-insoluble crosslinked polymer A was prepared in the following manner, and the saponification value of the polymer in the resulting dispersion was measured.

Preparation Example 1 (Dispersion 1 of
Crosslinked Polymer A)

The solution of the polymer A'1 produced in Production Example 1 was dried under reduced pressure to completely remove the solvent therefrom and thereby obtain the polymer A'1 as a dried product. Then, 15.3 parts of the thus obtained polymer A'1 were mixed with 74 parts of ion-exchanged water and further with 5.4 parts of triethanolamine available from Kishida Chemical Co., Ltd., to neutralize the polymer such that the ratio of the number of moles of triethanolamine to the number of moles of carboxy groups contained in the polymer was 55% (neutralization degree: 55 mol %). The resulting reaction solution was placed in a hermetically sealed reaction vessel and heated to 90° C. in a hot water bath, and then stirred for 3 hours to completely disperse the polymer in water, thereby obtaining a dispersion of the polymer A'1.

The resulting dispersion of the polymer A'1 was cooled to room temperature (25° C.), and 4.6 parts of trimethylolpropane polyglycidyl ether "DENACOL EX-321LT" (epoxy value: 140; water solubility rate: 27% by mass) as a water-insoluble crosslinking agent available from Nagase ChemteX Corporation were added thereto, followed by hermetically sealing the reaction vessel. The contents of the reaction vessel were heated at 90° C. for 1.5 hours while stirring with a stirrer. At this time, the crosslinking treatment was conducted by adding the crosslinking agent in such an amount that the epoxy groups contained in the crosslinking agent were capable of reacting with 50% of the total number of the carboxy groups contained in the polymer (crosslinking rate: 50%). Thereafter, the resulting reaction mixture was cooled to room temperature (25° C.), and then subjected to filtration treatment using a 25 mL-capacity needleless syringe available from Terumo Corporation fitted with a 5 μm-mesh membrane filter "Minisart NML 17594-K" (tradename) available from Sartorius Inc., thereby obtaining a dispersion 1 of the crosslinked polymer A. As a result of measuring a saponification value of the crosslinked polymer A in the dispersion 1 by the testing method using a neutralization titration method according to JIS-K-0070, it was confirmed that the saponification value of the crosslinked polymer A was 227 mgKOH/g in terms of a resin solid content of 100%.

Preparation Example 2 (Dispersion 2 of
Crosslinked Polymer A)

The same procedure as in Preparation Example 1 was repeated except that 74 parts of ion-exchanged water were replaced with 75 parts of ion-exchanged water, and 5.4 parts of triethanolamine were replaced with 4.3 parts of N-methyl diethanolamine available from Tokyo Chemical Industry Co., Ltd. (neutralization degree: 55 mol %), thereby obtaining a dispersion 2 of the crosslinked polymer A. As a result of measuring a saponification value of the crosslinked polymer A in the dispersion 2 by the testing method using a neutralization titration method according to JIS-K-0070, it was confirmed that the saponification value of the crosslinked polymer A was 233 mgKOH/g in terms of a resin solid content of 100%.

Preparation Example 3 (Dispersion 3 of
Crosslinked Polymer A)

The same procedure as in Preparation Example 1 was repeated except that 74 parts of ion-exchanged water were replaced with 76 parts of ion-exchanged water, and 5.4 parts of triethanolamine were replaced with 3.2 parts of N,N-dimethyl ethanolamine available from Wako Pure Chemical Industries, Ltd. (neutralization degree: 55 mol %), thereby obtaining a dispersion 3 of the crosslinked polymer A. As a result of measuring a saponification value of the crosslinked polymer A in the dispersion 3 by the testing method using a neutralization titration method according to JIS-K-0070, it was confirmed that the saponification value of the crosslinked polymer A was 231 mgKOH/g in terms of a resin solid content of 100%.

Preparation Example 4 (Dispersion 4 of Crosslinked Polymer A)

The same procedure as in Preparation Example 1 was repeated except that 74 parts of ion-exchanged water were replaced with 76 parts of ion-exchanged water, and 5.4 parts of triethanolaimine were replaced with 3.6 parts of triethylamine available from Wako Pure Chemical Industries, Ltd. (neutralization degree: 55 mol %), thereby obtaining a dispersion 4 of the crosslinked polymer A. As a result of measuring a saponification value of the crosslinked polymer A in the dispersion 4 by the testing method using a neutralization titration method according to JIS-K-0070, it was confirmed that the saponification value of the crosslinked polymer A was 230 mgKOH/g in terms of a resin solid content of 100%.

Preparation Example 5 (Dispersion 5 of Crosslinked Polymer A)

The same procedure as in Preparation Example 1 was repeated except that 15.3 parts of the polymer A'1 were replaced with 15.3 parts of the polymer A'2 obtained by drying the solution of the polymer A'2 produced in Production Example 2 under reduced pressure to completely remove the solvent therefrom, 74 parts of ion-exchanged water were replaced with 72 parts of ion-exchanged water, 5.4 parts of triethanolamine were replaced with 4.4 parts of the triethanolamine (neutralization degree: 55 mol %), and 4.6 parts of trimethylolpropane polyglycidyl ether as the water-insoluble crosslinking agent were replaced with 3.7 parts of the trimethylolpropane polyglycidyl ether (crosslinking rate: 50%), thereby obtaining a dispersion 5 of the crosslinked polymer A. As a result of measuring a saponification value of the crosslinked polymer A in the dispersion 5 by the testing method using a neutralization titration method according to JIS-K-0070, it was confirmed that the saponification value of the crosslinked polymer A was 184 mgKOH/g in terms of a resin solid content of 100%.

Preparation Example 6 (Dispersion 6 of Crosslinked Polymer A)

The same procedure as in Preparation Example 1 was repeated except that 74 parts of ion-exchanged water were replaced with 76 parts of ion-exchanged water, and 4.6 parts of trimethylolpropane polyglycidyl ether "DENACOL EX-321LT" as the water-insoluble crosslinking agent were replaced with 4.9 parts of 1,6-hexanediol diglycidyl ether "DENACOL EX-212" (epoxy value: 151; water solubility rate: 0% by mass) as the water-insoluble crosslinking agent available from Nagase ChemteX Corporation, thereby obtaining a dispersion 6 of the crosslinked polymer A. As a result of measuring a saponification value of the crosslinked polymer A in the dispersion 6 by the testing method using a neutralization titration method according to JIS-K-0070, it was confirmed that the saponification value of the crosslinked polymer A was 234 mgKOH/g in terms of a resin solid content of 100%.

Preparation Example 7 (Dispersion 7 of Crosslinked Polymer A)

The same procedure as in Preparation Example 2 was repeated except that 75 parts of ion-exchanged water were replaced with 73 parts of ion-exchanged water, and 4.3 parts of N-methyl diethanolamine available from Tokyo Chemical Industry Co., Ltd. (neutralization degree: 55 mol %), were replaced with 6.2 parts of the N-methyl diethanolamine (neutralization degree: 80 mol %), thereby obtaining a dispersion 7 of the crosslinked polymer A. As a result of measuring a saponification value of the crosslinked polymer A in the dispersion 7 by the testing method using a neutralization titration method according to JIS-K-0070, it was confirmed that the saponification value of the crosslinked polymer A was 230 mgKOH/g in terms of a resin solid content of 100%.

Preparation Example 8 (Dispersion 8 of Crosslinked Polymer A)

The same procedure as in Preparation Example 1 was repeated except that 15.3 parts of the polymer A'1 were replaced with 15.3 parts of the polymer A'3 obtained by drying the solution of the polymer A'3 produced in Production Example 3 under reduced pressure to completely remove the solvent therefrom, 74 parts of ion-exchanged water were replaced with 67 parts of ion-exchanged water, 5.4 parts of triethanolamine were replaced with 2.4 parts of the triethanolamine (neutralization degree: 55 mol %), and 4.6 parts of trimethylolpropane polyglycidyl ether as the water-insoluble crosslinking agent were replaced with 2 parts of the trimethylolpropane polyglycidyl ether (crosslinking rate: 50%), thereby obtaining a dispersion 8 of the crosslinked polymer A. As a result of measuring a saponification value of the crosslinked polymer A in the dispersion 8 by the testing method using a neutralization titration method according to JIS-K-0070, it was confirmed that the saponification value of the crosslinked polymer A was 94 mgKOH/g in terms of a resin solid content of 100%.

Preparation Example 9 (Dispersion 9 of Crosslinked Polymer A)

The same procedure as in Preparation Example 1 was repeated except that 74 parts of ion-exchanged water were replaced with 70 parts of ion-exchanged water, and 4.6 parts of trimethylolpropane polyglycidyl ether as the water-insoluble crosslinking agent were replaced with 3.6 parts of ethylene glycol diglycidyl ether "DENACOL EX-810" (epoxy value: 110; water solubility rate: 100% by mass) as the water-soluble crosslinking agent available from Nagase ChemteX Corporation (crosslinking rate: 50%), thereby obtaining a dispersion 9 of the crosslinked polymer A. As a result of measuring a saponification value of the crosslinked polymer A in the dispersion 9 by the testing method using a neutralization titration method according to JIS-K-0070, it was confirmed that the saponification value of the crosslinked polymer A was 235 mgKOH/g in terms of a resin solid content of 100%.

Preparation Example 10 (Dispersion 10 of Crosslinked Polymer A)

The same procedure as in Preparation Example 1 was repeated except that 74 parts of ion-exchanged water were replaced with 71 parts of ion-exchanged water, and 5.4 parts of triethanolamine were replaced with 8.5 parts of a 5N sodium hydroxide aqueous solution (sodium hydroxide solid content: 16.9%; for volumetric titration) available from Wako Pure Chemical Industries, Ltd. (neutralization degree: 55 mol %), thereby obtaining a dispersion 10 of the crosslinked polymer A. As a result of measuring a saponification value of the crosslinked polymer A in the dispersion 10 by the testing method using a neutralization titration method according to JIS-K-0070, it was confirmed that the saponification value of the crosslinked polymer A was 255 mgKOH/g in terms of a resin solid content of 100%. However, since the dispersion 10 of the crosslinked polymer A contained sodium hydroxide, the saponification value of the crosslinked polymer A was obtained by correction calculation according to the following formula in which D is calculated from the charged composition.

$$A=[(B-C)\times f \times 56.11\times (1/2)+D\times 56.11]/S$$

wherein
A: Saponification value
B: Amount (mL) of 0.5 mol/L hydrochloric acid used in a blank test
C: Amount (mL) of 0.5 mol/L hydrochloric acid used in titration
D: Amount (mmol) of substance of sodium hydroxide contained in a sample
f: Factor of 0.5 mol/L hydrochloric acid
S: Mass (g) of a sample
56.11: Formular weight (56.11) of potassium hydroxide Preparation Example 11 (Dispersion 11 of Crosslinked Polymer A)

The same procedure as in Preparation Example 1 was repeated except that 15.3 parts of the polymer A'1 were replaced with 15.3 parts of the polymer A'4 obtained by drying the solution of the polymer A'4 produced in Production Example 4 under reduced pressure to completely remove the solvent therefrom, 74 parts of ion-exchanged water were replaced with 70 parts of ion-exchanged water, 5.4 parts of triethanolamine were replaced with 3.5 parts of the triethanolamine (neutralization degree: 55 mol %), and 4.6 parts of trimethylolpropane polyglycidyl ether as the water-insoluble crosslinking agent were replaced with 3 parts of the trimethylolpropane polyglycidyl ether (crosslinking rate: 50%), thereby obtaining a dispersion 11 of the crosslinked polymer A. As a result of measuring a saponification value of the crosslinked polymer A in the dispersion 11 by the testing method using a neutralization titration method according to JIS-K-0070, it was confirmed that the saponification value of the crosslinked polymer A was 152 mgKOH/g in terms of a resin solid content of 100%.

PRODUCTION OF PIGMENT WATER DISPERSION

Example 1-1 (Pigment Water Dispersion 1)

(Step I)
The solution of the polymer A'1 produced in Production Example 1 was dried under reduced pressure to completely remove the solvent therefrom and thereby obtain the polymer A'1 as a dried product. Then, 32 parts of the thus obtained polymer A'1 were mixed with 204 parts of ion-exchanged water and further with 11.1 parts of triethanolamine available from Kishida Chemical Co., Ltd., to neutralize the polymer such that the ratio of the number of moles of triethanolamine to the number of moles of carboxy groups contained in the polymer was 55% (neutralization degree: 55 mol %). The resulting reaction solution was heated to 90° C. in a hot water bath, and then stirred for 1 hour to completely disperse the polymer in water, thereby obtaining a polymer dispersion.

(Step II)
The polymer dispersion obtained in the step I was cooled to room temperature (25° C.), and then 100 parts of a cyan pigment "TGR-SD" (tradename; C.I. Pigment Blue 15:3) available from DIC Corporation were added thereto. The resulting mixture was stirred at 20° C. for 3 hours using a disper "ULTRA DISPER" (tradename) available from Asada Iron Works Co., Ltd., while operating a disper blade thereof at a rotating speed of 6,000 rpm. Then, 124 parts of ion-exchanged water were added to the obtained mixture, and the resulting dispersion was subjected to dispersion treatment under a pressure of 150 MPa using "Microfluidizer" (tradename) available from Microfluidics Corporation by passing the dispersion through the device 15 times. The thus obtained dispersion was charged into a 500 mL angle rotor, and subjected to centrifugal separation using a high-speed cooling centrifuge "himac CR22G" (temperature set: 20° C.) available from Hitachi Koki Co., Ltd., at 3,660 rpm for 20 minutes to recover a liquid layer portion therefrom. Thereafter, the resulting liquid layer portion was subjected to filtration treatment through a 5 μm-mesh membrane filter "Minisart NML 17594-K" (tradename) available from Sartorius Inc., thereby obtaining an aqueous pigment dispersion solution. At this time, the solid content of the aqueous pigment dispersion solution was 25%, and the average particle size of the pigment-containing polymer A' particles contained in the aqueous pigment dispersion solution was 99 nm.

(Step III)
One hundred (100) parts of the aqueous pigment dispersion solution obtained in the step II were charged into a screw-neck glass bottle and mixed with 32 parts of ion-exchanged water, and 1.8 parts of trimethylolpropane polyglycidyl ether "DENACOL EX-321LT" (epoxy value: 140; water solubility rate: 27% by mass) as the water-insoluble crosslinking agent available from Nagase ChemteX Corporation were added to the glass bottle, followed by hermetically sealing the glass bottle. The contents of the glass bottle were heated at 70° C. for 5 hours while stirring with a stirrer. At this time, the crosslinking treatment was conducted by adding the crosslinking agent in such an amount that the epoxy groups contained in the crosslinking agent were capable of reacting with 50% of the total number of the carboxy groups contained in the polymer (crosslinking rate: 50%). After the elapse of 5 hours from the crosslinking treatment, the resulting reaction mixture was cooled to room temperature (25° C.), and then subjected to filtration treatment using a 25 mL-capacity needleless syringe available from Terumo Corporation fitted with a 5 μm-mesh filter, thereby obtaining a pigment water dispersion 1. The results are shown in Table 3.

Example 1-2 (Pigment Water Dispersion 2)

The same procedure as in Example 1-1 was repeated except that 204 parts of ion-exchanged water were replaced with 206 parts of ion-exchanged water, and 11.1 parts of triethanolamine were replaced with 8.9 parts of N-methyl diethanolamine available from Tokyo Chemical Industry Co., Ltd. (neutralization degree: 55 mol %), thereby obtaining a pigment water dispersion 2. The results are shown in Table 3.

Example 1-3 (Pigment Water Dispersion 3)

The same procedure as in Example 1-1 was repeated except that 204 parts of ion-exchanged water were replaced with 208 parts of ion-exchanged water, and 11.1 parts of triethanolamine were replaced with 6.6 parts of N,N-dimethyl ethanolamine available from Wako Pure Chemical Industries, Ltd. (neutralization degree: 55 mol %), thereby obtaining a pigment water dispersion 3. The results are shown in Table 3.

Example 1-4 (Pigment Water Dispersion 4)

The same procedure as in Example 1-1 was repeated except that 204 parts of ion-exchanged water were replaced with 207 parts of ion-exchanged water, and 11.1 parts of triethanolamine were replaced with 7.5 parts of triethylamine available from Wako Pure Chemical Industries, Ltd. (neutralization degree: 55 mol %), thereby obtaining a pigment water dispersion 4. The results are shown in Table 3.

Example 1-5 (Pigment Water Dispersion 5)

The same procedure as in Example 1-1 was repeated except that the cyan pigment was replaced with a magenta pigment "FASTOGEN Super Magenta JM02" (tradename; C.I. Pigment Red 122) available from DIC Corporation, thereby obtaining a pigment water dispersion 5. The results are shown in Table 3.

Example 1-6 (Pigment Water Dispersion 6)

The same procedure as in Example 1-2 was repeated except that the cyan pigment was replaced with a magenta pigment "FASTOGEN Super Magenta JM02" (tradename; C.I. Pigment Red 122) available from DIC Corporation, thereby obtaining a pigment water dispersion 6. The results are shown in Table 3.

Example 1-7 (Pigment Water Dispersion 7)

The same procedure as in Example 1-3 was repeated except that the cyan pigment was replaced with a magenta pigment "FASTOGEN Super Magenta JM02" (tradename; C.I. Pigment Red 122) available from DIC Corporation, thereby obtaining a pigment water dispersion 7. The results are shown in Table 3.

Example 1-8 (Pigment Water Dispersion 8)

The same procedure as in Example 1-1 was repeated except that the cyan pigment was replaced with a carbon black pigment "Monarch 717" (tradename; C.I. Pigment Black 7) available from Cabot Corporation, thereby obtaining a pigment water dispersion 8. The results are shown in Table 3.

Example 1-9 (Pigment Water Dispersion 9)

The same procedure as in Example 1-1 was repeated except that in the step I of Example 1-1, 32 parts of the polymer A'1 were replaced with 32 parts of the polymer A'2 obtained by drying the solution of the polymer A'2 produced in Production Example 2 under reduced pressure to completely remove the solvent therefrom, 204 parts of ion-exchanged water were replaced with 206 parts of ion-exchanged water, and 11.1 parts of triethanolamine were replaced with 9 parts of the triethanolamine (neutralization degree: 55 mol %); in the step II of Example 1-1, the cyan pigment was replaced with a magenta pigment "FASTOGEN Super Magenta JM02" (tradename; C.I. Pigment Red 122) available from DIC Corporation; and in the step III of Example 1-1, 32 parts of ion-exchanged water were replaced with 30 parts of ion-exchanged water, and 1.8 parts of trimethylolpropane polyglycidyl ether were replaced with 1.5 parts of the trimethylolpropane polyglycidyl ether (crosslinking rate: 50%), thereby obtaining a pigment water dispersion 9. The results are shown in Table 3.

Example 1-10 (Pigment Water Dispersion 10)

The same procedure as in Example 1-1 was repeated except that in the step III of Example 1-1, 1.8 parts of trimethylolpropane polyglycidyl ether as the water-insoluble crosslinking agent were replaced with 1.9 parts of 1,6-hexanediol diglycidyl ether "DENACOL EX-212" (epoxy value: 151; water solubility rate: 0% by mass) as the water-insoluble crosslinking agent available from Nagase ChemteX Corporation (crosslinking rate: 50%), thereby obtaining a pigment water dispersion 10. The results are shown in Table 3.

Example 1-11 (Pigment Water Dispersion 11)

The same procedure as in Example 1-6 was repeated except that in the step I of Example 1-6, 206 parts of ion-exchanged water were replaced with 202 parts of ion-exchanged water, and 8.9 parts of N-methyl diethanolamine (neutralization degree: 55 mol %) were replaced with 12.9 parts of the N-methyl diethanolamine (neutralization degree: 80 mol %), thereby obtaining a pigment water dispersion 11. The results are shown in Table 3.

Comparative Example 1-1 (Pigment Water Dispersion 12)

(Step I)
One hundred five (105) parts of the solution of the polymer A'3 (solvent: MEK) produced in Production Example 3 were mixed with 47.6 parts of MEK and further with 6.5 parts of triethanolamine available from Kishida Chemical Co., Ltd., to neutralize the polymer such that the ratio of the number of moles of triethanolamine to the number of moles of carboxy groups contained in the polymer was 55% (neutralization degree: 55 mol %).

(Step II)
The resulting neutralized polymer solution was further mixed with 290 parts of ion-exchanged water, and then 100 parts of a cyan pigment "TGR-SD" (tradename; C.I. Pigment Blue 15:3) available from DIC Corporation were added thereto. The resulting dispersion was stirred at 20° C. for 3 hours using a disper "ULTRA DISPER" (tradename) available from Asada Iron Works Co., Ltd., while operating a disper blade thereof at a rotating speed of 6,000 rpm. Then, the resulting mixture was subjected to dispersion treatment under a pressure of 150 MPa using "Microfluidizer" (tradename) available from Microfluidics Corporation by passing the mixture through the device 15 times. The thus obtained dispersion was mixed with 165 parts of ion-exchanged water and stirred together, and then allowed to stand at 60° C. under reduced pressure to completely remove MEK therefrom, followed by further removing a part of water therefrom. The resulting dispersion was charged into a 500 mL angle rotor, and subjected to centrifugal separation using a high-speed cooling centrifuge "himac CR22G" (temperature set: 20° C.) available from Hitachi Koki Co., Ltd., at 3,660 rpm for 20 minutes to separate a liquid layer portion therefrom. Thereafter, the resulting liquid layer portion was subjected to filtration treatment through a 5 μm-mesh membrane filter "Minisart NML 17594-K" (tradename) available from Sartorius Inc., thereby obtaining an aqueous pigment dispersion solution. At this time, the solid content of the thus obtained aqueous pigment dispersion solution was 25%.
(Step III)

One hundred (100) parts of the aqueous pigment dispersion solution obtained in the step II were charged into a screw-neck glass bottle and mixed with 29 parts of ion-exchanged water, and 1.0 part of trimethylolpropane polyglycidyl ether "DENACOL EX-321LT" (epoxy value: 140; water solubility rate: 27% by mass) as the water-insoluble crosslinking agent available from Nagase ChemteX Corporation was added to the glass bottle, followed by hermetically sealing the glass bottle. The contents of the glass bottle were heated at 70° C. for 5 hours while stirring with a stirrer. At this time, the crosslinking treatment was conducted by adding the crosslinking agent in such an amount that the epoxy groups contained in the crosslinking agent were capable of reacting with 50% of the total number of the carboxy groups contained in the polymer (crosslinking rate: 50%). After the elapse of 5 hours from the crosslinking treatment, the resulting reaction mixture was cooled to room temperature (25° C.), and then subjected to filtration treatment using a 25 mL-capacity needleless syringe available from Terumo Corporation fitted with a 5 μm-mesh filter, thereby obtaining a pigment water dispersion 12. The results are shown in Table 3.

Comparative Example 1-2 (Pigment Water Dispersion 13)

The same procedure as in Example 1-1 was repeated except that in the crosslinking treatment in the step III of Example 1-1, 32 parts of ion-exchanged water added to 100 parts of the aqueous pigment dispersion solution were replaced with 31 parts of ion-exchanged water, and 1.8 parts of trimethylolpropane polyglycidyl ether as the water-insoluble crosslinking agent were replaced with 1.5 parts of ethylene glycol diglycidyl ether "DENACOL EX-810" (epoxy value: 110; water solubility rate: 100% by mass) as the water-soluble crosslinking agent available from Nagase ChemteX Corporation, thereby obtaining a pigment water dispersion 13. The results are shown in Table 3.

Comparative Example 1-3 (Pigment Water Dispersion 14)

The same procedure as in Example 1-1 was repeated except that in the step III of Example 1-1, 32 parts of ion-exchanged water added to 100 parts of the aqueous pigment dispersion solution were replaced with 27 parts of ion-exchanged water, and 5 parts of a 5N sodium hydroxide aqueous solution (sodium hydroxide solid content: 16.9%; for volumetric titration) (ratio of the number of moles of sodium hydroxide to the number of moles of carboxy groups contained in the polymer: 82%) available from Wako Pure Chemical Industries, Ltd., were further added thereto, thereby obtaining a pigment water dispersion 14. The content of the water-soluble amine compound in the water-soluble basic compound contained in the pigment water dispersion 14 was 40 mol % as calculated according to the following formula: [ratio of number of moles of water-soluble amine compound to number of moles of carboxy groups contained in polymer/(ratio of number of moles of water-soluble amine compound to number of moles of carboxy groups contained in polymer+ratio of number of moles of sodium hydroxide to number of moles of carboxy groups contained in polymer)=55/(55+82)]. The results are shown in Table 3.

Comparative Example 1-4 (Pigment Water Dispersion 15)

The same procedure as in Example 1-1 was repeated except that in the step I of Example 1-1, 204 parts of ion-exchanged water were replaced with 202 parts of ion-exchanged water, and 11.1 parts of triethanolamine were replaced with 12.8 parts of a 5N sodium hydroxide aqueous solution (sodium hydroxide solid content: 16.9%; for volumetric titration) available from Wako Pure Chemical Industries, Ltd. (neutralization degree: 40 mol %), thereby obtaining a pigment water dispersion 15. The results are shown in Table 3.

Comparative Example 1-5 (Pigment Water Dispersion 16)

The same procedure as in Example 1-1 was repeated except that in the step I of Example 1-1, 32 parts of the polymer A'1 were replaced with 32 parts of the polymer A'4 obtained by drying the solution of the polymer A'4 produced in Production Example 4 under reduced pressure to completely remove the solvent therefrom, 204 parts of ion-exchanged water were replaced with 207 parts of ion-exchanged water, and 11.1 parts of triethanolamine were replaced with 7.2 parts of the triethanolamine (neutralization degree: 55 mol %); in the step II of Example 1-1, the cyan pigment was replaced with a magenta pigment "FASTOGEN Super Magenta JM02" (tradename; C.I. Pigment Red 122) available from DIC Corporation; and in the step III of Example 1-1, 32 parts of ion-exchanged water added to 100 parts of the aqueous pigment dispersion solution were replaced with 29 parts of ion-exchanged water, and 1.8 parts of trimethylolpropane polyglycidyl ether were replaced with 1.2 parts of the trimethylolpropane polyglycidyl ether (crosslinking rate: 50%), thereby obtaining a pigment water dispersion 16. The results are shown in Table 3.

Meanwhile, the details of colors of pigments, water-soluble basic compounds and crosslinking agents as shown in Table 3 are as follows.

Colors of Pigments

C: Cyan pigment
M: Magenta pigment
Bk: Carbon Black pigment
(Water-Soluble Basic Compounds)
TEA: Triethanolamine (boiling point (b.p.): 335° C.)
MDEA: N-methyl diethanolamine (b.p.: 247° C.)
DMEA: N,N-dimethyl ethanolamine (b.p.: 135° C.)
TEthyA: Triethylamine (b.p.: 90° C.)
NaOHaq: Sodium hydroxide aqueous solution (Crosslinking Agents)

EX321: Trimethylolpropane polyglycidyl ether ("DENACOL EX-321LT")

EX212: 1,6-Hexanediol diglycidyl ether ("DENACOL EX-212")

EX810: Ethylene glycol diglycidyl ether ("DENACOL EX-810")

Tables 4 and 5, and the contents of the glass container were stirred with a magnetic stirrer for 10 minutes, thereby obtaining a mixture Q.

Next, while stirring the mixture Q, the respective pigment water dispersions 1 to 16 were added to the mixture Q, and then a water dispersion of polymer B particles, a water-soluble amine compound or a 1N sodium hydroxide aqueous

TABLE 3

| | Kind of pigment water dispersion | Color of pigment | Kind of polymer A' | Water-soluble basic compound | Neutralization degree of polymer A' (mol %)*1 | Average particle size of pigment-containing polymer A' particles (nm) | Crosslinking agent |
|---|---|---|---|---|---|---|---|
| | | | | Examples | | | |
| 1-1 | 1 | C | A'1 | TEA | 55 | 99 | EX321 |
| 1-2 | 2 | C | A'1 | MDEA | 55 | 96 | EX321 |
| 1-3 | 3 | C | A'1 | DMEA | 55 | 94 | EX321 |
| 1-4 | 4 | C | A'1 | TEthyA | 55 | 97 | EX321 |
| 1-5 | 5 | M | A'1 | TEA | 55 | 129 | EX321 |
| 1-6 | 6 | M | A'1 | MDEA | 55 | 129 | EX321 |
| 1-7 | 7 | M | A'1 | DMEA | 55 | 128 | EX321 |
| 1-8 | 8 | Bk | A'1 | TEA | 55 | 92 | EX321 |
| 1-9 | 9 | M | A'2 | TEA | 55 | 135 | EX321 |
| 1-10 | 10 | C | A'1 | TEA | 55 | 100 | EX212 |
| 1-11 | 11 | M | A'1 | MDEA | 80 | 128 | EX321 |
| | | | | Comparative Examples | | | |
| 1-1 | 12 | C | A'3 | TEA | 55 | 107 | EX321 |
| 1-2 | 13 | C | A'1 | TEA | 55 | 99 | EX810 |
| 1-3 | 14 | C | A'1 | TEA/NaOHaq | 137 | 99 | EX321 |
| 1-4 | 15 | C | A'1 | NaOHaq | 40 | 103 | EX321 |
| 1-5 | 16 | M | A'4 | TEA | 55 | 131 | EX321 |

| | Saponification value of crosslinked polymer A (mgKOH/g) | Mass ratio [pigment/crosslinked polymer A] | Average particle size of pigment-containing crosslinked polymer A particles (nm) | pH | Solid content (%) |
|---|---|---|---|---|---|
| | | Examples | | | |
| 1-1 | 227 | 71/29 | 97 | 7.7 | 20.0 |
| 1-2 | 233 | 71/29 | 96 | 8.0 | 20.0 |
| 1-3 | 231 | 71/29 | 96 | 7.8 | 20.0 |
| 1-4 | 230 | 71/29 | 100 | 7.7 | 20.0 |
| 1-5 | 227 | 71/29 | 117 | 8.0 | 20.0 |
| 1-6 | 233 | 71/29 | 122 | 8.0 | 20.0 |
| 1-7 | 231 | 71/29 | 117 | 7.7 | 20.0 |
| 1-8 | 227 | 71/29 | 92 | 8.0 | 20.0 |
| 1-9 | 184 | 71/29 | 128 | 7.8 | 20.0 |
| 1-10 | 234 | 71/29 | 98 | 7.6 | 20.0 |
| 1-11 | 230 | 71/29 | 121 | 8.8 | 20.0 |
| | | Comparative Examples | | | |
| 1-1 | 94 | 69/31 | 105 | 9.7 | 20.0 |
| 1-2 | 235 | 71/29 | 97 | 7.6 | 20.0 |
| 1-3 | 227 | 71/29 | 97 | 8.7 | 20.0 |
| 1-4 | 255 | 71/29 | 96 | 8.0 | 20.0 |
| 1-5 | 152 | 71/29 | 123 | 8.2 | 20.0 |

Note:
*1Neutralization degree (mol %) of carboxy groups in polymer A'

<Preparation of Water-Based Inks>

Examples 2-1 to 2-11 (Inks 1 to 11) and
Comparative Examples 2-1 to 2-5 (Inks 12 to 16)

A glass container was charged with propylene glycol, diethylene glycol monoisobutyl ether, a polyether-modified silicone "KF-6011" available from Shin-Etsu Chemical Co., Ltd., and an acetylene-based surfactant "SURFYNOL 440" available from Nissin Chemical Co., Ltd., as shown in solution serving for adjusting the pH value, and ion-exchanged water were further added to the mixture, followed by successively stirring the resulting dispersion for 1 hour. Thereafter, the obtained dispersion was subjected to filtration treatment through a 5 μm-mesh disposable membrane filter "Minisart NML 17594-K" (tradename) available from Sartorius Inc., thereby obtaining respective water-based inks 1 to 16. Compositions and properties of the thus obtained water-based inks are shown in Tables 4 and 5. The respective asterisked notations as shown in Tables 4 and 5 are as follows.

1*: Polyether-modified silicone "KF-6011" available from Shin-Etsu Chemical Co., Ltd.

*2: Acetylene-based surfactant "SURFYNOL 440" available from Nissin Chemical Co., Ltd.

TABLE 4

|  |  | Examples | | | | | | | | | | |
| --- | --- | --- | --- | --- | --- | --- | --- | --- | --- | --- | --- | --- |
|  |  | 2-1 | 2-2 | 2-3 | 2-4 | 2-5 | 2-6 | 2-7 | 2-8 | 2-9 | 2-10 | 2-11 |
| Formulation of ink (part(s)) | | | | | | | | | | | | |
| Pigment water dispersion | Kind | 1 | 2 | 3 | 4 | 5 | 6 | 7 | 8 | 9 | 10 | 11 |
|  | Part(s) | 17.40 | 17.40 | 17.40 | 17.40 | 17.40 | 17.40 | 17.40 | 17.40 | 17.40 | 17.72 | 17.62 |
| Propylene glycol | | 12.50 | 12.50 | 12.50 | 12.50 | 12.50 | 12.50 | 12.50 | 12.50 | 12.50 | 12.50 | 12.50 |
| Diethylene glycol monoisobutyl ether | | 2.50 | 2.50 | 2.50 | 2.50 | 2.50 | 2.50 | 2.50 | 2.50 | 2.50 | 2.50 | 2.50 |
| Water dispersion of polymer B particles | | 2.40 | 2.40 | 2.40 | 2.40 | 2.40 | 2.40 | 2.40 | 2.40 | 2.40 | 2.40 | 2.40 |
| "KF-6011" (*1) | | 0.25 | 0.25 | 0.25 | 0.25 | 0.25 | 0.25 | 0.25 | 0.25 | 0.25 | 0.25 | 0.25 |
| "SURFYNOL 440" (*2) | | 0.50 | 0.50 | 0.50 | 0.50 | 0.50 | 0.50 | 0.50 | 0.50 | 0.50 | 0.50 | 0.50 |
| Triethanolamine (TEA) | | 0.02 | | | | 0.02 | | | | 0.02 | 0.02 | 0.02 |
| N-methyl diethanolamine (MDEA) | | | 0.01 | | | | 0.01 | | | | | 0.01 |
| N,N-dimethyl ethanolamine (DMEA) | | | | 0.01 | | | | 0.01 | | | | |
| Triethylamine (TEthyA) | | | | | 0.01 | | | | | | | |
| 1N NaOHaq | | | | | | | | | | | | |
| Ion-exchanged water | | 14.43 | 14.44 | 14.44 | 14.44 | 14.43 | 14.44 | 14.44 | 14.43 | 14.43 | 14.11 | 14.22 |
| Properties of ink | | | | | | | | | | | | |
| Viscosity at 32° C. | mPa·s | 3.9 | 4.0 | 4.1 | 4.0 | 4.3 | 4.2 | 4.3 | 4.1 | 4.2 | 4.0 | 4.4 |
| pH | — | 7.7 | 8.0 | 7.9 | 7.7 | 7.9 | 8.0 | 7.7 | 8.0 | 7.9 | 7.6 | 8.9 |

TABLE 5

|  |  | Comparative Examples | | | | |
| --- | --- | --- | --- | --- | --- | --- |
|  |  | 2-1 | 2-2 | 2-3 | 2-4 | 2-5 |
| Formulation of ink (part(s)) | | | | | | |
| Pigment water dispersion | Kind | 12 | 13 | 14 | 15 | 16 |
|  | Part(s) | 17.40 | 17.40 | 17.40 | 17.40 | 17.40 |
| Propylene glycol | | 12.50 | 12.50 | 12.50 | 12.50 | 12.50 |
| Diethylene glycol monoisobutyl ether | | 2.50 | 2.50 | 2.50 | 2.50 | 2.50 |
| Water dispersion of polymer B particles | | 2.40 | 2.40 | 2.40 | 2.40 | 2.40 |
| "KF-6011" (*1) | | 0.25 | 0.25 | 0.25 | 0.25 | 0.25 |
| "SURFYNOL 440" (*2) | | 0.50 | 0.50 | 0.50 | 0.50 | 0.50 |
| Triethanolamine (TEA) | | 0.02 | 0.02 | 0.02 | | 0.02 |
| N-methyl diethanolamine (MDEA) | | | | | | |
| N,N-dimethyl ethanolamine (DMEA) | | | | | | |
| Triethylamine (TEthyA) | | | | | | |
| 1N NaOHaq | | | | | 0.14 | |
| Ion-exchanged water | | 14.43 | 14.43 | 14.43 | 14.31 | 14.43 |
| Properties of ink | | | | | | |
| Viscosity at 32° C. | mPa·s | 4.8 | 4.3 | 4.5 | 4.1 | 4.4 |
| pH | — | 9.6 | 7.6 | 8.8 | 8.0 | 8.2 |

<Evaluation>

The thus prepared water-based inks were subjected to evaluation of redispersibility thereof by the following method (1). In addition, using the thus prepared water-based inks, a printed material was produced by the following method (2) to evaluate water resistance of the printed material obtained using a polyester film as a printing medium. Furthermore, the respective water-based inks were evaluated for storage stability thereof by the following method (3). The results are shown in Table 6.

In addition, a printed material obtained using a cloth fabric as a printing medium was evaluated for water resistance thereof by the following method (4).

(1) Evaluation of Redispersibility

The evaluation of redispersibility of the water-based ink was conducted assuming that a solvent in the water-based ink newly supplied into nozzles of an ink-jet printing apparatus was brought into contact with the ink previously supplied and dried therein, so that the pigment-containing polymer particles contained in the dried ink were redispersed in the solvent contained in the newly supplied ink. More specifically, 10 μL of the ink was added dropwise into a 30 mL polypropylene container (φ=40 mm; height=30 mm), and dried in a drying box at 40° C. for 2 hours. The dried water-based ink was returned to room temperature condition, and then 7 g of water was added dropwise onto the dried ink, followed by stirring the resulting ink solution using a shaking device "Multi-Shaker MMS-210" available from Tokyo Rikakikai Co., Ltd., at 150 rpm for 1 minute. Thereafter, the redispersibility of the dried ink was visually observed and evaluated according to the following ratings.

[Evaluation Ratings]

A: Dried ink was completely redispersed, and no residue was recognizable.

B: Less than 30% of the dried ink was recognized as a residue.

C: Not less than 30% and less than 80% of the dried ink was recognized as a residue.

D: Not less than 80% of dried ink was recognized as a residue.

(2) Evaluation of Water Resistance of Printed Material Obtained Using Polyester Film as Printing Medium Using the water-based ink, image printing was conducted on a printing medium, and after drying the water-based ink on the printing medium, the printed images were allowed to contact with water to evaluate occurrence of peeling of the ink from the printing medium. More specifically, 0.5 g of the ink was dropped on a polyester film "LUMIRROR T60" (thickness: 75 μm; water absorption: 2.3 g/m²) available from Toray Industries Inc., and drawn thereover at a speed of about 30 cm/sec using a bar coater "SA-203; Rod No. 4" (liquid film thickness: 1 μm) available from TESTER SANGYO CO., LTD., to prepare a printed material. Immediately after that, the thus prepared printed material was placed in a constant-temperature dryer "DVS402" available from Yamato Scientific Co., Ltd., which was set to a temperature of 60° C. or 100° C., and dried therein for 10 minutes. The dried printed material was returned to room temperature condition, and then subjected to water resistance test in which the surface of the printed material onto which the ink was adhered was rubbed by 10 reciprocating motions with a cotton swab (100% natural cotton) available from Johnson & Johnson K.K., impregnated with ion-exchanged water. The thus rubbed printed material was visually observed to examine whether or not any peeling of the ink on the printing medium occurred, and the water resistance of the printed material was evaluated according to the following ratings.

[Evaluation Ratings]

A: No peeling of the ink on the printed material was observed.

B: Peeling of the ink on the printed material was observed in less than 10% of a printed surface area of the printed material.

C: Peeling of the ink on the printed material was observed in not less than 10% of a printed surface area of the printed material.

(3) Evaluation of Storage Stability

The storage stability of the ink was evaluated by the following method. That is, the water-based ink prepared above was filled in a hermetically sealed container and subjected to storage test in a thermostatic chamber at 70° C. After the elapse of four weeks from initiation of the storage test, the water-based ink was taken out from the container to measure an average particle size of the pigment-containing crosslinked polymer A particles in the water-based ink by the aforementioned method. The change in average particle size of the pigment-containing crosslinked polymer A particles in the water-based ink was observed from an initial stage of the storage test to evaluate storage stability of the water-based ink according to the following ratings. The results are shown in Table 6.

[Evaluation Ratings]

A: Amount of change in average particle size of the particles in the water-based ink after being subjected to storage test at 70° C. for four weeks relative to that before being subjected to the storage test was within +15 nm (inclusive of +15 nm).

B: Amount of change in average particle size of the particles in the water-based ink after being subjected to storage test at 70° C. for four weeks relative to that before being subjected to the storage test was more than +15 nm (exclusive of +15 nm).

TABLE 6

| Kind of water-based ink | Color of pigment | Water-soluble amine compound | | Saponification value of crosslinked polymer A (mgKOH/g) | Kind of crosslinking agent |
|---|---|---|---|---|---|
| | | Kind (*3) | Boiling point (° C.) | | |
| Examples | | | | | |
| 2-1 | 1 | C | TEA | 335 | 227 | Water-insoluble (EX321) |
| 2-2 | 2 | C | MDEA | 247 | 233 | Water-insoluble (EX321) |
| 2-3 | 3 | C | DMEA | 135 | 231 | Water-insoluble (EX321) |
| 2-4 | 4 | C | TEthyA | 90 | 230 | Water-insoluble (EX321) |
| 2-5 | 5 | M | TEA | 335 | 227 | Water-insoluble (EX321) |
| 2-6 | 6 | M | MDEA | 247 | 233 | Water-insoluble (EX321) |
| 2-7 | 7 | M | DMEA | 135 | 231 | Water-insoluble (EX321) |
| 2-8 | 8 | Bk | TEA | 335 | 227 | Water-insoluble (EX321) |
| 2-9 | 9 | M | TEA | 335 | 184 | Water-insoluble (EX321) |
| 2-10 | 10 | C | TEA | 335 | 234 | Water-insoluble (EX212) |
| 2-11 | 11 | M | MDEA | 247 | 230 | Water-insoluble (EX321) |
| Comparative Examples | | | | | |
| 2-1 | 12 | C | TEA | 335 | 94 | Water-insoluble (EX321) |
| 2-2 | 13 | C | TEA | 335 | 235 | Water-soluble (EX810) |
| 2-3 | 14 | C | TEA | 335 | 227 | Water-insoluble (EX321) |
| 2-4 | 15 | C | — | — | 255 | Water-insoluble (EX321) |
| 2-5 | 16 | M | TEA | 335 | 152 | Water-insoluble (EX321) |

| | Content of water-soluble amine compound (mol %) (*1) | Redispersibility | Water resistance | | Storage stability | |
|---|---|---|---|---|---|---|
| | | | 60° C. | 100° C. | Evaluation | Change amount (*2) |
| Examples | | | | | | |
| 2-1 | 100 | A | B | A | A | +1 |
| 2-2 | 100 | A | A | A | A | +1 |
| 2-3 | 100 | B | A | A | A | +4 |
| 2-4 | 100 | C | A | A | A | +5 |
| 2-5 | 100 | A | B | A | A | −7 |
| 2-6 | 100 | A | A | A | A | −3 |

TABLE 6-continued

|  | *1 | *2 | *3 |  |  |  |
|---|---|---|---|---|---|---|
| 2-7 | 100 | B | A | A | A | −3 |
| 2-8 | 100 | A | B | A | A | −4 |
| 2-9 | 100 | B | B | A | A | −4 |
| 2-10 | 100 | A | B | A | A | +1 |
| 2-11 | 100 | A | B | A | A | −3 |
| Comparative Examples | | | | | | |
| 2-1 | 100 | D | B | A | A | +3 |
| 2-2 | 100 | A | B | A | B | +39 |
| 2-3 | 40 | A | C | C | A | 0 |
| 2-4 | 0 | A | C | C | A | −4 |
| 2-5 | 100 | D | B | A | A | +11 |

Meanwhile, the respective asterisked notations as shown in Table 6 are as follows.

*1: Content (mol %) of the water-soluble amine compound in the water-soluble basic compound.

*2: Amount (nm) of change in average particle size of the particles in the water-based ink after being subjected to storage test relative to that before being subjected to the storage test.

*3: The notations concerning the water-soluble amine compound are the same as those mentioned previously.

From Table 6, it was confirmed that the water-based inks obtained in Examples 2-1 to 2-11 were excellent in balance between redispersibility, water resistance and storage stability as compared to the water-based inks obtained in Comparative Examples 2-1 to 2-5. Accordingly, it was also confirmed that by using the pigment water dispersion of the present invention in the water-based ink, it was possible to maintain good redispersibility of the dried ink in ink-ejection nozzles, produce a printed material having excellent water resistance, and obtain an ink having excellent storage stability.

(4) Evaluation of Water Resistance of Printed Material Obtained Using Cloth Fabric as Printing Medium Using the water-based ink 1 obtained in Example 2-1, image printing was conducted on a printing medium formed of a cloth fabric (cotton broadcloth with mercerization available from Shikisensha Co., Ltd.) cut into a B5 size, to prepare a printed material, and the thus prepared printed material was evaluated for water resistance thereof.

(Preparation and Evaluation of Ink-Jet Printed Material)

Under the environmental conditions of a temperature of 25±1° C. and a relative humidity of 30±5%, the water-based ink 1 (cyan) was loaded into a one-pass system print evaluation apparatus available from Trytech Co., Ltd., equipped with an ink-jet print head "KJ4B-HDO6MHG-STDV" (piezoelectric type) available from Kyocera Corporation.

The operating conditions of the print evaluation apparatus were set to a head applied voltage of 26 V, a frequency of 10 kHz, an ejected ink droplet amount of 12 pL, a head temperature of 32° C., a resolution of 600 dpi, a number of ink shots for flashing before being ejected of 200 shots and a negative pressure of −4.0 kPa, and the printing medium was fixed on a transportation table by vacuum such that the longitudinal direction of the printing medium was aligned with a transportation direction thereof.

A printing command was transmitted to the aforementioned print evaluation apparatus to print a Duty 100% solid image having a size of 5 cm×5 cm, thereby obtaining an ink-jet printed material. The resulting printed material was immediately dried for 10 minutes in a constant-temperature dryer set to 100° C., returned to room temperature condition, and then subjected to water resistance test in which the surface of the printed material onto which the ink was adhered was rubbed by 10 reciprocating motions with a cotton swab impregnated with ion-exchanged water similarly to the aforementioned procedure for evaluating water resistance of the printed material. As a result, it was confirmed that the water resistance of the printed material using the water-based ink 1 and the cloth fabric as the printing medium was evaluated as being Rank A according to the aforementioned evaluation ratings for water resistance.

The invention claimed is:

1. A pigment water dispersion comprising pigment-containing water-insoluble crosslinked polymer A particles, a water-soluble basic compound and water,
   in which a water-insoluble crosslinked polymer A constituting the particles comprises a carboxy group and a crosslinked structure comprising an ester group derived from a water-insoluble polyfunctional epoxy crosslinking agent comprising not less than 2 and not more than 3 glycidyl ether groups derived from a polyhydric alcohol comprising a hydrocarbon group having not less than 3 and not more than 6 carbon atoms, wherein the water-insoluble crosslinked polymer A is a polymer obtained by subjecting a carboxy group-containing water-insoluble polymer A' to crosslinking treatment;
   a saponification value of the water-insoluble crosslinked polymer A is not less than 170 mgKOH/g and not more than 300 mgKOH/g; and
   the water-soluble basic compound comprises a water-soluble amine compound.

2. The pigment water dispersion according to claim 1, wherein a content of the water-soluble amine compound in the water-soluble basic compound is not less than 50 mol %.

3. The pigment water dispersion according to claim 1, wherein a boiling point of the water-soluble amine compound is not lower than 85° C. and not higher than 350° C.

4. The pigment water dispersion according to claim 1, wherein the water-soluble amine compound is an alkanolamine having not less than 2 and not more than 8 carbon atoms.

5. The pigment water dispersion according to claim 1, wherein a water solubility rate of the water-insoluble crosslinking agent is not more than 50% by mass.

6. The pigment water dispersion according to claim 1, wherein a mass ratio of the pigment to the water-insoluble crosslinked polymer A [pigment/water-insoluble crosslinked polymer A] is not less than 30/70 and not more than 90/10.

7. A process for producing a pigment water dispersion comprising pigment-containing water-insoluble crosslinked polymer A particles, a water-soluble basic compound and water, said process comprising:
   Step I: subjecting a mixture comprising a carboxy group-containing water-insoluble polymer A', a water-soluble basic compound and water to dispersion treatment to obtain a polymer dispersion;

Step II: adding a pigment to the polymer dispersion obtained in the step I and then subjecting the resulting mixture to dispersion treatment to obtain an aqueous pigment dispersion solution; and Step III: adding a water-insoluble polyfunctional epoxy crosslinking agent comprising not less than 2 and not more than 3 glycidyl ether groups derived from a polyhydric alcohol comprising a hydrocarbon group having not less than 3 and not more than 6 carbon atoms to the aqueous pigment dispersion solution obtained in the step II to subject the polymer to crosslinking treatment, thereby obtaining the pigment water dispersion, in which a saponification value of a water-insoluble crosslinked polymer A constituting the particles is not less than 170 mgKOH/g and not more than 300 mgKOH/g; and the water-soluble basic compound in the pigment water dispersion comprises a water-soluble amine compound.

8. The process for producing a pigment water dispersion according to claim 7, wherein a neutralization degree of the carboxy groups in the water-insoluble polymer A' in the step I is not less than 10 mol % and not more than 80 mol %.

9. The process for producing a pigment water dispersion according to claim 7, wherein the water-insoluble polymer A' comprises a constitutional unit derived from (a-1) a carboxy group-containing monomer and a constitutional unit derived from (a-2) a hydrophobic monomer.

10. A water-based ink for ink-jet printing comprising the pigment water dispersion according to claim 1, and a water-soluble organic solvent, in which the water-soluble organic solvent comprises one or more organic solvents each having a boiling point of not lower than 90° C., and a boiling point of the water-soluble organic solvent as a weighted mean value of boiling points of the one or more organic solvents which are weighted by contents (% by mass) of the respective organic solvents is not higher than 250° C.

11. An ink-jet printing method comprising the steps of:
ejecting the water-based ink for ink-jet printing according to claim 10 by an ink-jet ejecting method to allow the water-based ink to adhere onto a printing medium; and
then drying the printing medium onto which the water-based ink is adhered, at a temperature of not lower than 40° C.

12. The ink-jet printing method according to claim 11, wherein the printing medium is a fiber.

13. The pigment water dispersion according to claim 1, wherein the water-insoluble polymer A' comprises a constitutional unit derived from (a-1) a carboxy group-containing monomer and a constitutional unit derived from (a-2) a hydrophobic monomer.

14. The pigment water dispersion according to claim 13, wherein a mass ratio of the component (a-1) to the component (a-2) [component (a-1)/component (a-2)] is not less than 0.05 and not more than 1.2.

15. The pigment water dispersion according to claim 1, wherein the water-soluble amine compound is at least one compound selected from the group consisting of N-methyl diethanolamine, N,N-dimethyl ethanolamine, diethanolamine and triethanolamine.

16. The pigment water dispersion according to claim 1, wherein the content of the pigment in the pigment water dispersion is not less than 3.0% by mass and not more than 20% by mass.

17. The water-based ink according to claim 10, further comprises pigment-free water-insoluble polymer B particles.

18. The pigment water dispersion according to claim 1, wherein a content of the water-soluble amine compound in the water-soluble basic compound is not less than 70 mol %.

19. The pigment water dispersion according to claim 1, wherein a boiling point of the water-soluble amine compound is not lower than from 100° C. and not higher than to 350° C.

20. The pigment water dispersion according to claim 1, wherein the water-soluble amine compound is a tertiary ethanolamine.

* * * * *